US008712720B2

(12) United States Patent
Nicholson et al.

(10) Patent No.: US 8,712,720 B2
(45) Date of Patent: Apr. 29, 2014

(54) FILTERING METHOD FOR IMPROVING THE DATA QUALITY OF GEOMETRIC TIRE MEASUREMENTS

(75) Inventors: Verner Steve Nicholson, Pelzer, SC (US); Anton Felipe Thomas, Greer, SC (US)

(73) Assignees: Michelin Recherche at Technique S.A., Granges-Paccot (CH); Societe de Technologie Michelin, Clermont-Ferrand (FR)

( * ) Notice: Subject to any disclaimer, the term of this patent is extended or adjusted under 35 U.S.C. 154(b) by 270 days.

(21) Appl. No.: 13/139,345

(22) PCT Filed: Dec. 18, 2009

(86) PCT No.: PCT/US2009/068641
§ 371 (c)(1),
(2), (4) Date: Jun. 13, 2011

(87) PCT Pub. No.: WO2010/080571
PCT Pub. Date: Jul. 15, 2010

(65) Prior Publication Data
US 2011/0246128 A1 Oct. 6, 2011

(30) Foreign Application Priority Data
Dec. 19, 2008 (WO) ........................ PCT/US08/87704

(51) Int. Cl.
*G06F 15/00* (2006.01)
(52) U.S. Cl.
USPC ................ 702/145; 702/97; 702/34; 702/41; 340/442; 73/470; 73/146; 451/1; 451/5; 451/254; 700/110; 700/104
(58) Field of Classification Search
USPC .................. 702/145; 340/679, 683, 443, 442; 73/146, 66; 451/1, 5, 11, 28, 52, 241, 451/254
See application file for complete search history.

(56) References Cited

U.S. PATENT DOCUMENTS 3,841,033 A * 10/1974 Appleby et al. ................ 451/24
4,155,789 A 5/1979 Wireman et al.
(Continued)

FOREIGN PATENT DOCUMENTS

EP 0 565 320 A2 10/1993
GB 2 351 346 A 12/2000
(Continued)

OTHER PUBLICATIONS

PCT International Search Report for PCT/US2009/068641, Dated Mar. 29, 2010.
(Continued)

*Primary Examiner* — Carol S Tsai
(74) *Attorney, Agent, or Firm* — Dority & Manning, P.A.

(57) ABSTRACT

A tire measurement system includes a computer with various memory/media elements for storing raw and transformed tire measurement data (e.g., a data set of measured radial or lateral run-out values) as well as software in the form of computer-executable instructions, which are executed by a processor to filter selected run-out values within the obtained data set that spike above adjacent measurements, identify selected ones of the filtered run-out values that lie on a convex hull surrounding the entire set of values, and perform interpolation of the identified selected ones of the run-out values that lie on the convex hull to obtain a final data set of filtered run-out measurements. Similar steps can be performed on an inverted data set to better detect sidewall deformation features such as sidewall depressions.

18 Claims, 14 Drawing Sheets

(56) References Cited

U.S. PATENT DOCUMENTS

| | | | |
|---|---|---|---|
| 4,327,580 A | 5/1982 | Suzuki et al. | |
| 6,086,452 A * | 7/2000 | Lipczynski et al. | 451/5 |
| 6,386,945 B1 * | 5/2002 | Fahringer et al. | 451/5 |
| 6,539,789 B1 | 4/2003 | Kostka et al. | |
| 6,615,144 B2 * | 9/2003 | Williams et al. | 702/41 |
| 6,820,074 B1 * | 11/2004 | Simpson | 708/290 |
| 6,868,358 B2 * | 3/2005 | Brown, Jr. | 702/138 |
| 7,012,609 B2 | 3/2006 | Rose et al. | |
| 7,082,816 B2 | 8/2006 | Zhu | |
| 7,580,812 B2 * | 8/2009 | Ariyur et al. | 702/190 |
| 8,113,049 B2 * | 2/2012 | Corghi | 73/462 |
| 8,200,461 B2 * | 6/2012 | Fang | 703/2 |
| 8,287,675 B2 | 10/2012 | Mawby et al. | |
| 2002/0177959 A1 * | 11/2002 | Williams et al. | 702/41 |
| 2003/0149542 A1 | 8/2003 | Chang | |
| 2004/0017289 A1 * | 1/2004 | Brown, Jr. | 340/442 |
| 2005/0259859 A1 * | 11/2005 | Hassler et al. | 382/141 |
| 2006/0123898 A9 | 6/2006 | Zhu | |
| 2006/0138705 A1 * | 6/2006 | Korba et al. | 264/319 |
| 2008/0103659 A1 * | 5/2008 | Mancosu et al. | 701/41 |
| 2009/0279757 A1 * | 11/2009 | Drabycz et al. | 382/128 |
| 2010/0005883 A1 * | 1/2010 | Corghi | 73/470 |
| 2010/0180676 A1 * | 7/2010 | Braghiroli et al. | 73/146 |
| 2011/0118989 A1 * | 5/2011 | Morinaga | 702/34 |
| 2012/0035757 A1 * | 2/2012 | Mawby et al. | 700/104 |
| 2012/0095587 A1 * | 4/2012 | Hair et al. | 700/110 |

FOREIGN PATENT DOCUMENTS

| | | |
|---|---|---|
| JP | S58-200140 | 11/1983 |
| JP | S62-232507 | 10/1987 |
| JP | S63-191947 | 8/1988 |
| JP | H02-042306 | 2/1990 |
| JP | H05-215530 | 8/1993 |
| JP | H10-160452 | 6/1998 |
| JP | H10-160453 | 6/1998 |
| JP | 2002-116012 | 4/2002 |
| JP | 2004-156919 | 5/2002 |
| JP | 2002-350126 | 12/2004 |
| JP | 2004-361344 | 12/2004 |
| JP | 2005-069693 | 3/2005 |
| JP | 2005-181253 | 7/2005 |
| JP | 2007-106090 | 4/2007 |

OTHER PUBLICATIONS

Allan Bereczki, Giuseppe A. Cirino, and Spero Penha Morato, "Tri-dimensional Laser Engraving of Industrial Injection Moulds, for Fresnel Surface Generation", *Annals of Optics*, 2006.

* cited by examiner

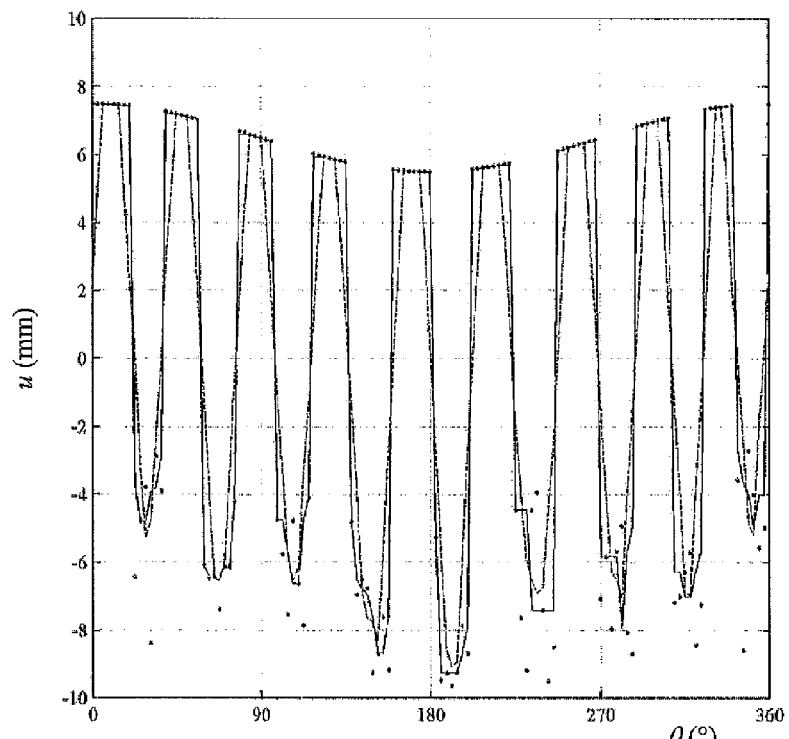
Fig. 3
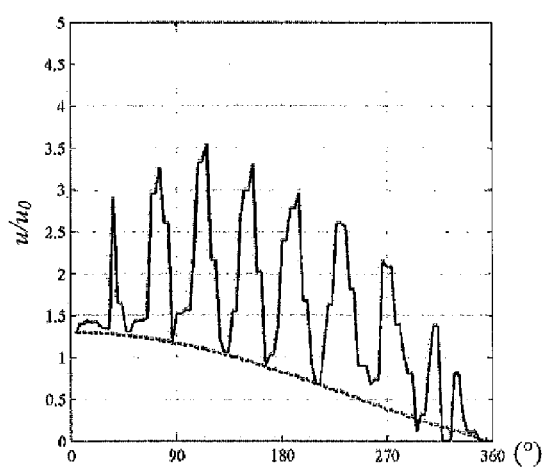 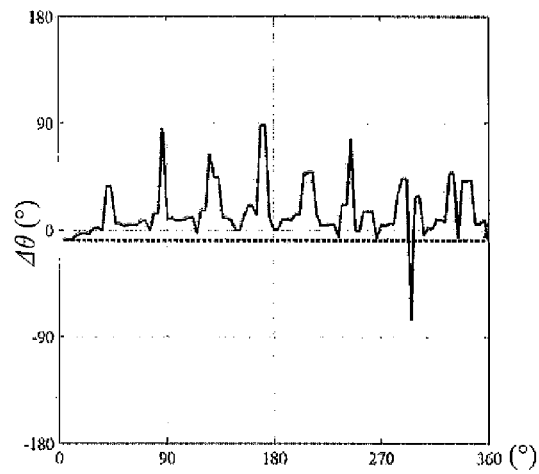
Fig. 4A          Fig. 4B

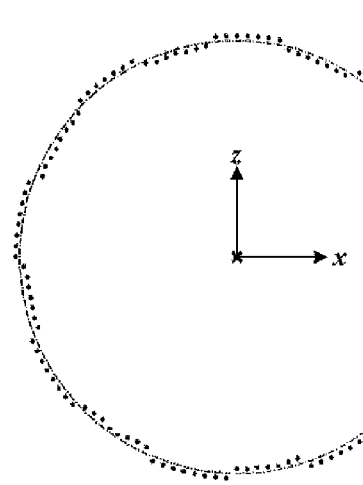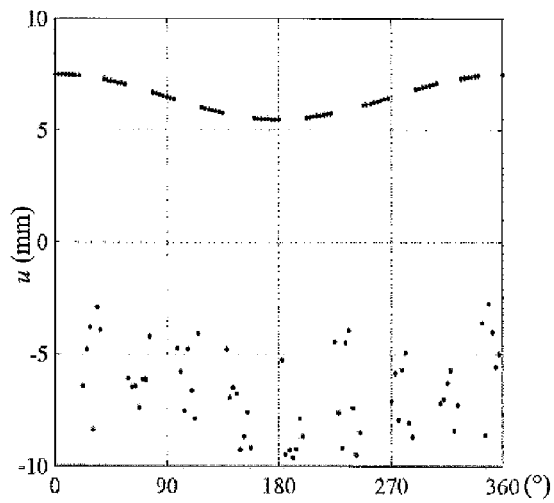
Fig. 6A  Fig. 6B
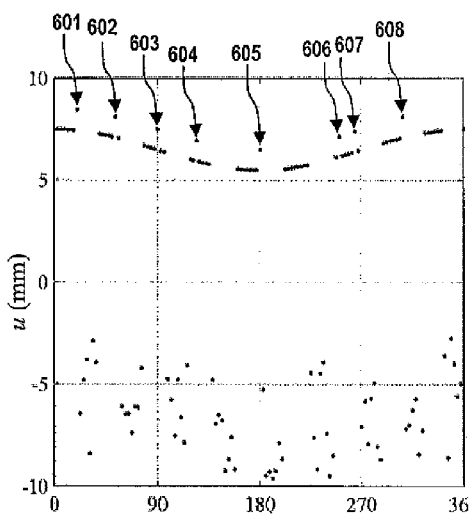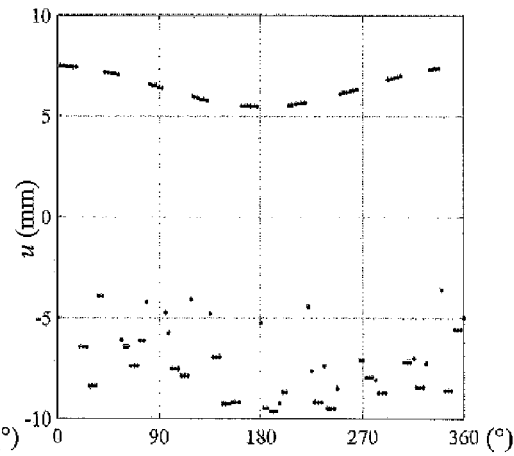
Fig. 6C  Fig. 6D

FILTERING METHOD FOR IMPROVING THE DATA QUALITY OF GEOMETRIC TIRE MEASUREMENTS

RELATED APPLICATIONS

This application is a nationalization of PCT International Application No. PCT/US2009/068641, filed Dec. 18, 2009, entitled "Filtering Method for Improving Data Quality of Geometric Tire Measurements," which claims priority to PCT International Application No. PCT/US2008/087704, filed Dec. 19, 2008, entitled "Filtering Method to Eliminate Tread Features in Geometric Tire Measurements." Both applications are hereby incorporated by reference herein for all purposes.

FIELD OF THE INVENTION

The present subject matter generally concerns a filtering method for improving the data quality of geometric tire measurements. In particular, techniques are disclosed for automatic filtering of tire parameter data to eliminate geometric features such as tread grooves, tread ridges, tread flashing, etc. in a tire or associated mounting environment.

BACKGROUND OF THE INVENTION

It is often desirable to measure a variety of geometric features and performance parameters associated with a tire during both tire manufacturing and testing. Measurement of geometric characteristics of a tire during rotation, including but not limited to parameters such as run-out, mass imbalance, and uniformity measurements, can often be used to help identify potential causes of vehicle vibrations at both high and low traveling speeds. Geometric measurements associated with a tire may also help characterize such phenomena as tread wear and the like over the lifetime of a tire. Additional measurements, such as lateral run-out or sidewall deformation can be used to identify and control such conditions as outward projections or bulges attributable to possible open joints or missing body ply cords within a tire as well as inward facing depressions or dents which may come from a tire joint potentially having too much overlap.

Some conventional measurement methods have employed contact sensors to obtain geometric tire measurements, including but not limited to radial and lateral run-out measurements. For example, sidewall deformation has normally been measured with a contacting sensor along a "clear path" or substantially smooth surface formed along the tire sidewall or shoulder location of a tire. However, off-road tire designs that incorporate tread features along the sidewall and/or shoulder surfaces restrict or eliminate the possible locations for a clear path. Tread features and other structural elements formed along a tire crown inhibit the ability to use contact sensors for obtaining radial measurements. As such, non-contact sensors such as laser sensors and related measurement equipment may be used to obtain the geometric tire measurements. However, a need remains for how best to analyze the obtained measurements to account for the presence of tread features and others in subsequent data processing.

In order to effectively analyze a data set of geometric tire measurements, the obtained measurement data must be free of anomalies. In general, a tire may be modeled geometrically as having substantially uniform tracks along the radial periphery (e.g., tire crown location), lateral periphery (e.g., tire sidewall location), tire shoulder locations and the like. However, data anomalies can be introduced into such a uniform surface model when geometric measurements are obtained relative to certain tire features, such as tread ridges and grooves, tire flashing, and other geometric features that may be formed along the tire crown, shoulder and/or sidewall locations. In addition, data anomalies may be inadvertently introduced into a set of geometric tire measurements because of infrequent errors or overshoot introduced by non-contact measurement equipment.

In light of the need for obtaining clean data sets of tire measurement data to most effectively perform subsequent analysis of tire parameters and related conditions, it is desirable to implement post-measurement processing techniques to improve the quality of geometric tire measurement data. Although known technology for data filtering has been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved apparatus and methodology has been provided to automatically filter measured tire parameters (e.g., radial and lateral run out) to more accurately model a tire by removing geometric features, such as but not limited to flashing, tread ridges, tread grooves and the like located along crown, sidewall, and/or shoulder locations of the tire.

One exemplary embodiment of the present subject matter relates to a method of processing geometric measurements for a tire. Such method may include various steps, including measuring the surface of a tire to obtain a data set of geometric measurements consisting of a plurality of parameter values at respective angular positions relative to the given tire and then applying data conditioning and/or filtering to the raw data measurements. More particularly, data filtering may include electronically filtering selected parameter values within the obtained data set that have greater magnitude than adjacent values, electronically identifying selected ones of the filtered parameter values that lie on a convex hull surrounding the entire set of values, and/or electronically interpolating (e.g., by linear interpolation, spline interpolation, cubic spline interpolation, fill interpolation, or other interpolation method) the identified selected ones of the filtered parameter values that lie on the convex hull to obtain a final data set of filtered run-out measurements.

In some more particular embodiments of the above technology, the measured surface of the tire comprises at least one location along the tire sidewall or shoulder, and the method further includes a step of electronically analyzing the final data set of filtered measurements to identify sidewall deformation characteristics in the form of one or more of sidewall projections and sidewall depressions. Identification of sidewall depressions may be determined by inverting the initial conditioned data set before filtering and subsequently re-inverting the data. In other more particular embodiments of the above technology, the measured surface of the tire comprises at least one location along the tire crown, and the method further includes decomposing the final data set of filtered measurements into a plurality of harmonic components.

In still further more particular exemplary embodiments of the above method, the step of electronically identifying selected ones of the filtered parameter values that lie on a convex hull surrounding the entire set of values more particularly includes a step of transforming each parameter value into a surface value expressed in terms of a curvature location along the surface of the given tire, measured in first and second orthogonal directions. Such transformation may involve taking each parameter value as a run-out value $u_n$, n=1, 2, 3, ..., N for some predetermined integer value N at each angular position $\theta_n$ in the data set of run-out measurements and transforming such values into two-dimensional form represented by first and second quantities $R_{nx}$ and $R_{nz}$ determined by the following equations: $R_{nx}=(R_0+u_n)\cos\theta_n$; and $R_{nz}=(R_0+u_n)\sin\theta_n$. For some embodiments (e.g., radial run out measurements), $R_0$ represents a nominal radius associated with the measured tire. For other embodiments (e.g., lateral run out measurements), $R_0$ represents a selected constant value for the tire radius.

In addition to various methodologies, it is to be understood that the present subject matter equally relates to associated systems, including various hardware and/or software components that may be provided in a tire measurement system. In one exemplary embodiment, the present subject matter concerns a tire measurement system for measuring and processing run-out associated with a given tire rotated at one or more predetermined speeds. Such a measurement machine may generally include two different types of hardware components, namely measurement components and post-measurement processing components.

The measurement components of a particular tire measurement system may include a measurement machine adapted to securely receive a given tire and rotate the tire at one or more predetermined speeds. At least one sensor, such as but not limited to a laser displacement sensor, is positioned relative to the given tire and adjustable along lateral and/or radial directions for measuring the tire surface at one or more tracks along the radial and/or lateral periphery of the tire. The sensors measure displacement of the tire from the laser, which can be used to directly calculate tire radial or lateral run-out values at respective angular positions relative to a reference point (i.e., an index pulse) on the tire surface.

Additional measurement hardware may include such modular components as an optical encoder and a data acquisition device. An optical encoder may be coupled to the measurement machine and may include at least one respective first and second data channels for providing a control signal adapted to define a plurality of data points per tire revolution, and for providing a control signal adapted to provide a once per revolution index pulse to synchronize data to a reference point on the given tire. The data acquisition device may also be coupled to the measurement machine for converting received sensor measurements from analog to digital format and storing the converted run-out measurements in memory.

In one exemplary embodiment, processing components of the tire measurement system include a first memory/media element adapted for storing measurements, each measurement corresponding to a geometric parameter value obtained at an angular position relative to the given tire, a second memory/media element adapted for storing software in the form of computer-executable instructions, and at least one processor coupled to the first and second memories and configured to selectively implement the computer-executable instructions stored in the second memory to process the run-out measurements stored in the first memory. A third memory/media element may also be provided for storing output data to provide to a user or for subsequent processing or feedback control.

In a particular embodiment of the above tire measurement system, the one or more processors implement the computer-executable instructions stored in memory in order to process raw run-out measurements stored in memory by implementing the functions of: identifying selected ones of the geometric parameter values that lie on a convex hull surrounding the entire set of values, and interpolating the identified selected ones of the geometric parameter values that lie on the convex hull to obtain a final data set of filtered measurements. Additional functions may selectively correspond to averaging measured parameter values across many tire revolutions at each given angular position, filtering selected parameter values within the obtained data set that have greater magnitude than adjacent values, transforming the plurality of parameter values into two-dimensional form, inverting data sets before and after filtering, and decomposing the final data set of filtered measurements into a plurality of harmonic components.

Additional embodiments of the present subject matter, not necessarily expressed in the summarized section, may include and incorporate various combinations of aspects of features, components, or steps referenced in the summarized embodiments above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which:

FIG. 3 provides a graphical representation of a captured data set of tire radial run-out measurements (u) versus angular position ($\theta$) with the application of post-measurement processing in accordance with known median filter and moving average filter techniques;

FIG. 4A provides a graphical representation of the ratio of filtered run-out magnitude to actual run-out magnitude as a function of window size using a median filter technique and a moving average filter technique;

FIG. 4B provides a graphical representation of the difference in phase angle ($\Delta\theta$) of run-out measurements as a function of window size using a median filter technique and a moving average filter technique;

FIG. 6A provides a graphical representation of an exemplary data set of radial surface measurements (R) obtained at various angular positions (θ) in accordance with an exemplary embodiment of the present invention;

FIG. 6B provides a graphical representation of an exemplary data set of initial run-out measurements (u) expressed in one dimension in terms of angular position (θ) in accordance with an exemplary embodiment of the present invention;

FIG. 6C provides a graphical representation of an exemplary data set of initial run-out measurements expressed in one dimension in terms of angular position with the inclusion of upward data spikes that may occur, for example, from the presence of tread flashing or the like;

FIG. 6D provides a graphical representation of aspects of the exemplary data set of FIG. 6C after application of an erosion pre-filter in accordance with an exemplary embodiment of the present invention;

Figure 1:
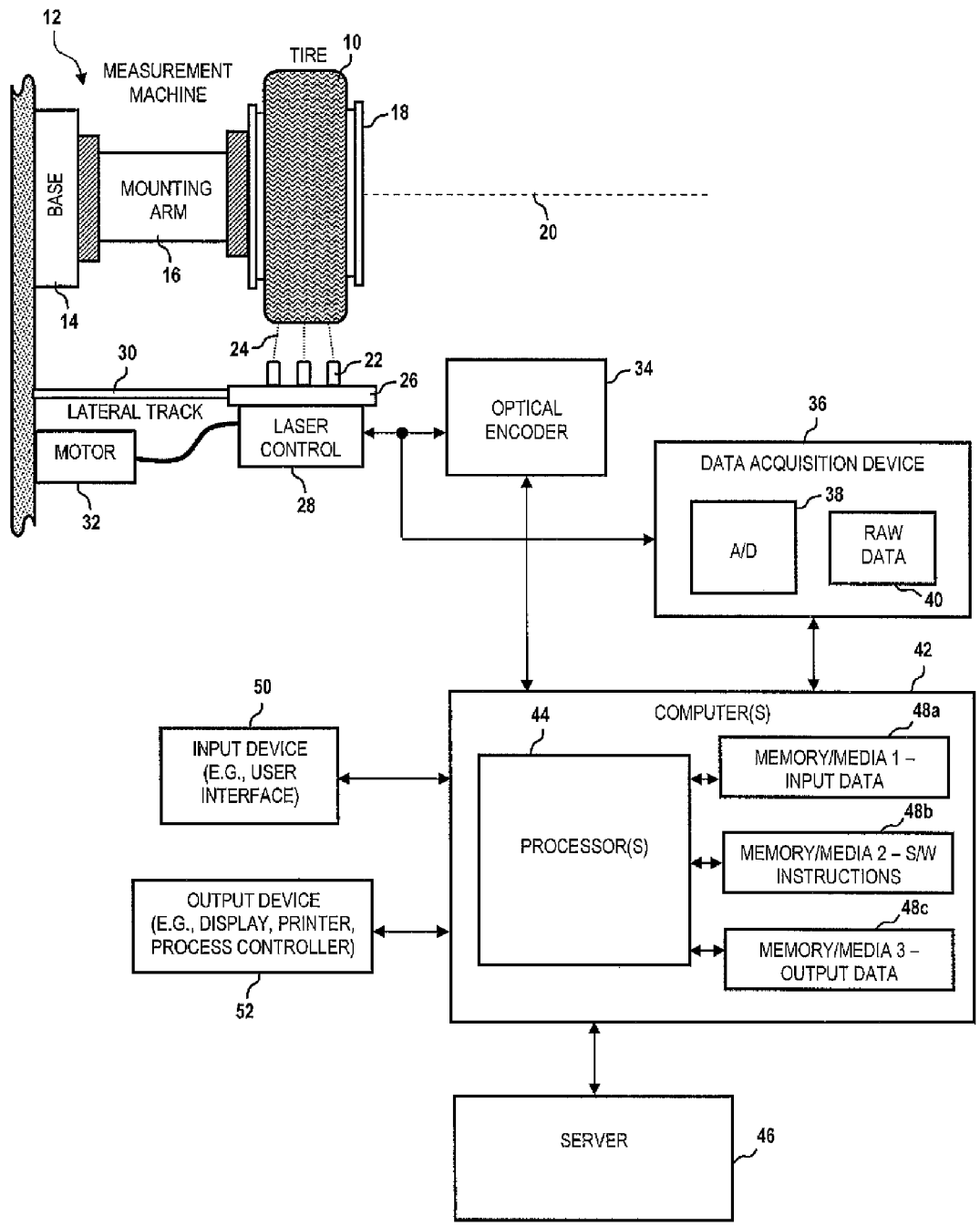
FIG. 1 is a block diagram of exemplary hardware components in a tire measurement system in accordance with the present invention, including various exemplary measurement components as well as post-measurement computer processing components.

Repeat use of reference characters throughout the present specification and appended drawings is intended to represent same or analogous features, elements or steps of the present invention.

DETAILED DESCRIPTION OF THE PREFERRED EMBODIMENTS

As discussed in the Summary of the Invention section, the present subject matter is generally concerned with a system and method for improving the quality of data measurements obtained when measuring the surface of a rotating object (e.g., a tire). In particular, data quality can be improved by filtering geometric features associated with a tire or other data anomalies. Some of the embodiments disclosed herein discuss such filtering steps and features in the context of particular geometric tire measurements such as run-out, although it should be appreciated that the presently disclosed technology can generally be applied to improving the data quality of any geometric measurement set.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

The technology discussed herein makes reference to processors, servers, memories, databases, software applications, and/or other computer-based systems, as well as actions taken and information sent to and from such systems. Computer-implemented processes may be implemented using a single server or processor or multiple such elements working in combination. Databases and other memory/media elements and applications may be implemented on a single system or distributed across multiple systems. Distributed components may operate sequentially or in parallel. Data may travel between system components directly or indirectly, and may also travel over one or more networks, such as but not limited to a dial-in network, a local area network (LAN), wide area network (WAN), public switched telephone network (PSTN), the Internet, intranet or Ethernet type networks and others implemented over any combination of hard-wired and/or wireless communication links.

Referring now to the drawings, a brief discussion of exemplary hardware components used to obtain initial geometric tire measurements as well as performing post-measurement processing techniques will be discussed with reference to FIG. 1. The specific processing/filtering method of the present invention will then be discussed in detail with reference to the remaining figures before providing additional details about the hardware components in FIG. 1. Such discussion is generally directed to different types of radial run-out (RRO) measurements (i.e., run-out data generally measured along a tire tread location), and/or lateral run-out (LRO) measurements (i.e., run-out data generally measured along a tire shoulder or sidewall location), although it may be possible to also apply the disclosed filtering and other post-measurement processing techniques to other geometric tire measurements, including but not limited to tread wear measurements.

Referring now to FIG. 1, in order to obtain tire measurements in accordance with the present subject matter, a tire 10 is arranged on a mounting fixture within a measurement machine 12 and rotated centrifugally at one or more predetermined speeds. When run-out measurements are desired, measurement machine 12 may be configured to operate as a variable speed radial or lateral run-out measurement machine. In one embodiment, measurement machine 12 may generally include such exemplary features as a base 14, mounting arm 16 and mounting fixture 18. The mounting fixture 18 serves as a hub having similar qualities to a tire rim or other rigid disk configured to rotate centrifugally around a center line 20. Although the measurement apparatus illustrated in FIG. 1 is shown as accommodating tire mounting and rotation in the substantially vertical direction, similar to how a tire would rotate along a road surface, it should be appreciated that other mounting orientations are possible. For example, the tire and associated measurement equipment can alternatively be mounted to accommodate tire rotation in a substantially horizontal configuration.

Referring still to the measurement machine of FIG. 1, one or more sensors 22 are positioned relative to the tire 10. Sensors 22 may operate by contact, non-contact or near contact positioning relative to tire 10 in order to determine the position of the tire surface as it rotates about the center line 20. In one embodiment, sensors 22 are non-contact laser sensors. FIG. 1 illustrates three sensors 22 in order to obtain multiple sets of measurement data along a plurality of measurement tracks relative to tire 10. It should be appreciated that a fewer or greater number of sensors may be employed. It should be further appreciated that either the tire 10 or sensors 22 may be configured in different placement locations relative to one another. Although FIG. 1 depicts the sensors 22 positioned relative to a tire crown location of tire 10, the sensors 22 and associated hardware may be positioned relative to a tire sidewall or shoulder location to measure other tire surfaces.

The measurement machine 12 and laser sensors 22 are interfaced with additional hardware components, including an optical encoder 34, data acquisition device 36 and other associated modules to collectively measure tire parameters and obtain raw data. In general, optical encoder 34 helps coordinate the geometric measurements at a plurality of data points around a peripheral surface location of a tire. This may be accomplished by providing a control signal defining a plurality of data points (e.g., 2048 data points at different angular positions around a tire periphery) and another control signal providing a once per revolution index pulse to synchronize data to a reference point on the measured tire. In general, the data acquisition device converts measurements obtained from the sensor(s) 22 from analog to digital format and stores the converted run-out measurements in a memory device.

The obtained tire measurements are ultimately provided to a computer 42 for post-measurement processing and filtering. Computer 42 may include one or more processors 44 configured to receive input data including raw measurements of tire parameters, process and filter such measurements, and provide useable output such as data to a user or signals to a process controller. Such computing/processing devices may be adapted to provide desired functionality by accessing software instructions rendered in a computer-readable form stored in one or more of the memory/media elements 48. When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits.

Figure 2A:
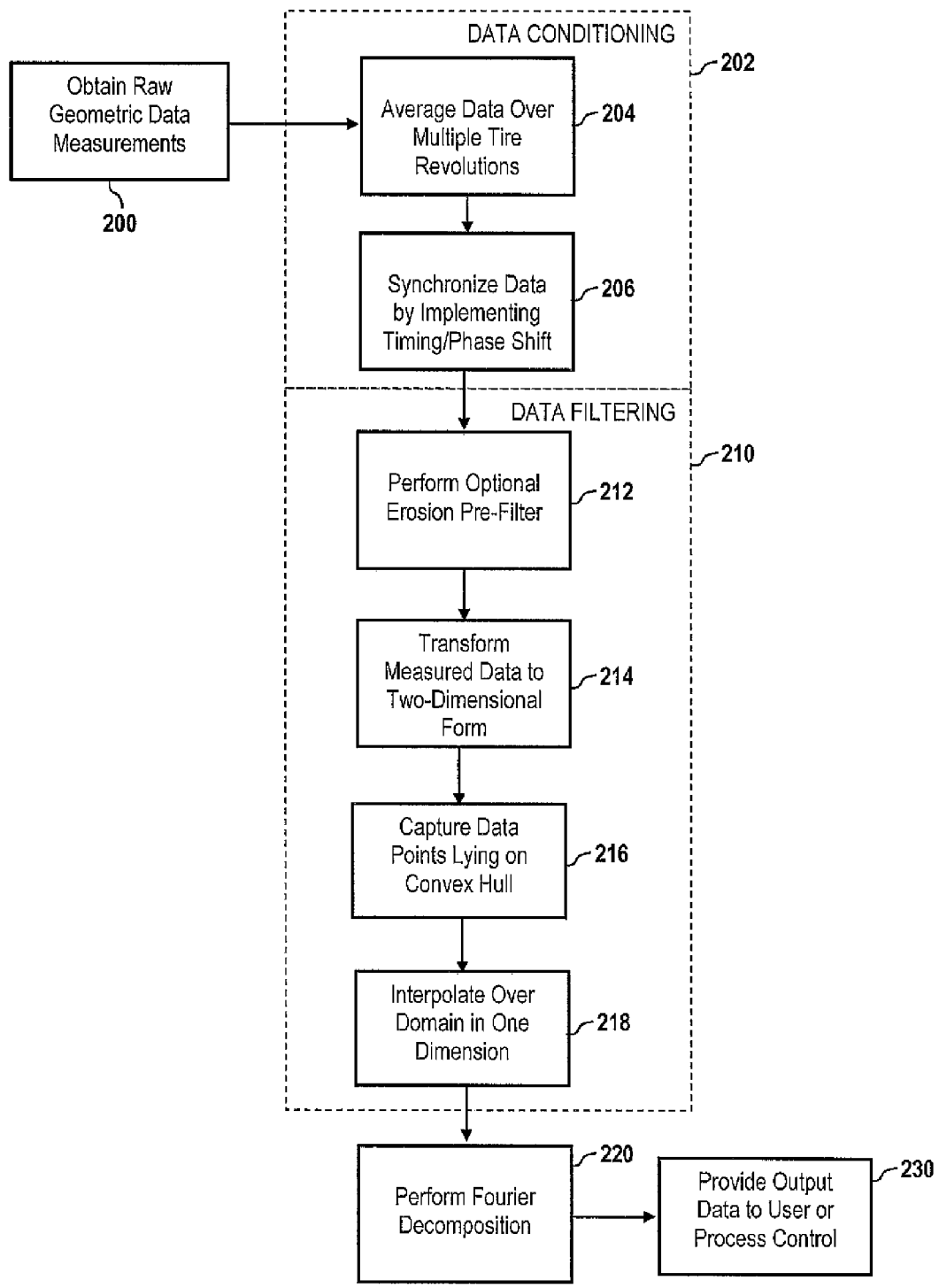
FIG. 2A provides a flow chart of exemplary steps and features in a method of measuring and processing geometric tire performance parameters such as radial run-out.
Figure 2B:
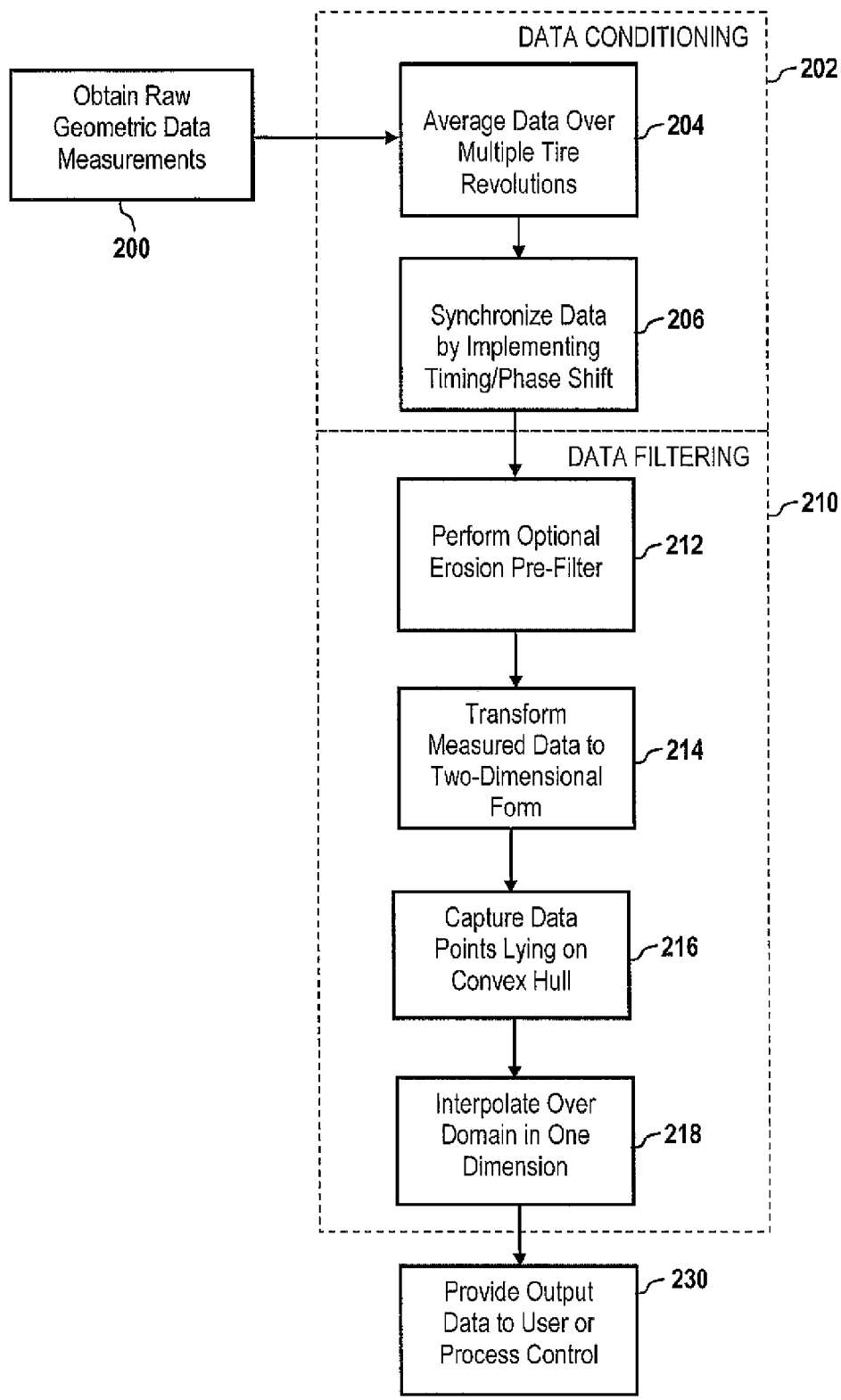
FIG. 2B provides a flow chart of exemplary steps and features in a first method of measuring and processing geometric tire performance parameters such as lateral run-out.
Figure 2C:
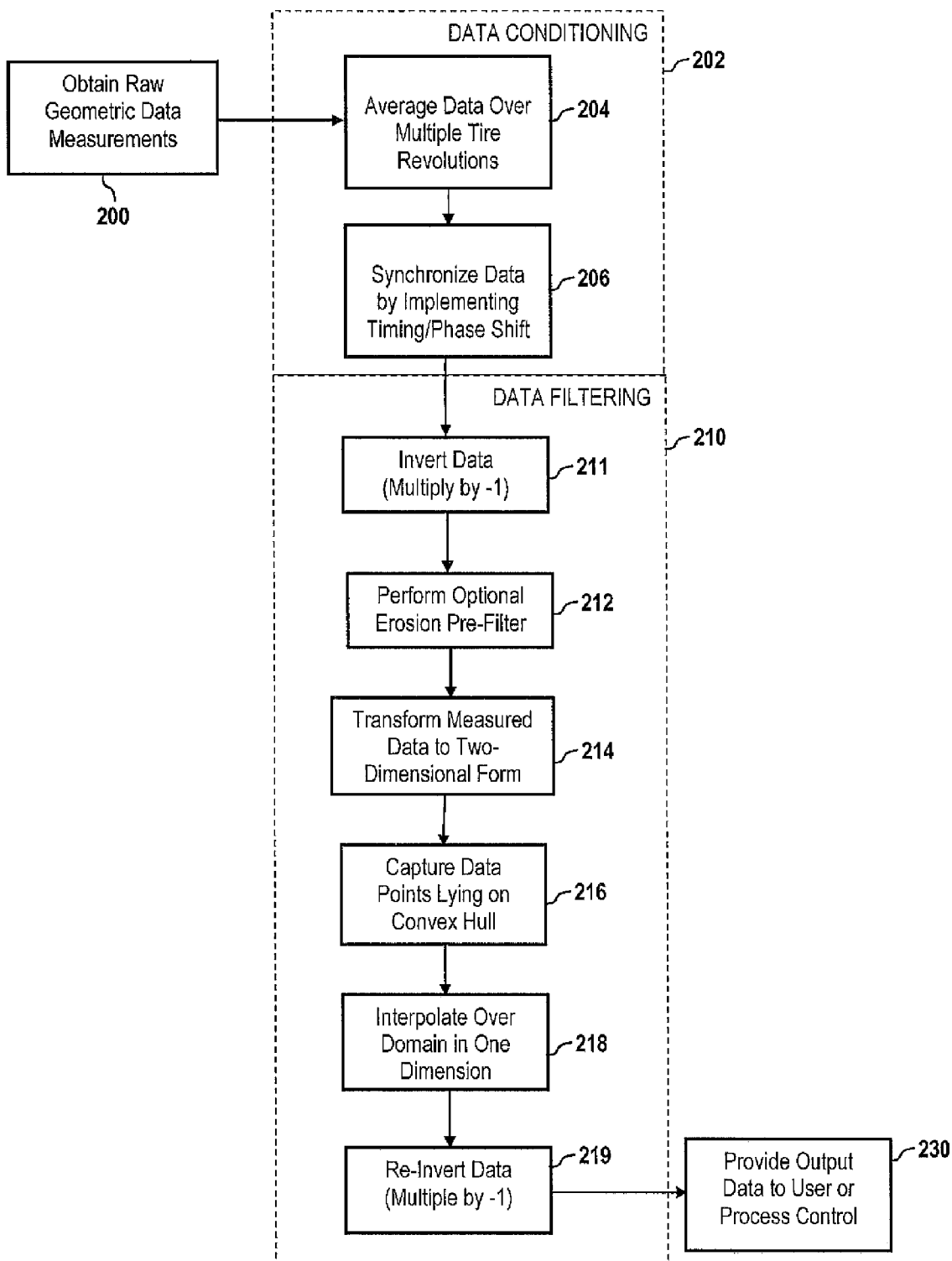
FIG. 2C provides a flow chart of exemplary steps and features in a second method of measuring and processing geometric tire performance parameters such as lateral run-out.

Referring now to FIGS. 2A, 2B and 2C, additional description of the various steps and functions implemented by the hardware components of FIG. 1 are discussed. FIG. 2A depicts exemplary steps that may be employed during processing and analysis of radial run out measurements, and FIGS. 6A-8B variously describe an example of such process. FIGS. 2B and 2C depict exemplary steps that may be employed during processing and analysis of lateral run out measurements. FIG. 2B provides steps that may be used for analyzing a top trace of measured data (i.e., the data points measured along tread ridge locations), which may be desired for detecting sidewall bulges. FIG. 2C provides steps that may be used for analyzing a bottom trace of measured data (i.e., the data points measured along tread groove locations) which may be desired for detecting sidewall depressions. FIGS. 9-12 variously describe an example of the process set forth in FIG. 2B, while FIGS. 9 and 13-17 variously describe an example of the process set forth in FIG. 2C. Regardless of whether run-out measurements are obtained along a tire crown (i.e., radial run-out measurements) or along a tire sidewall or shoulder (i.e., lateral run-out measurements), many of the same processing and filtering steps are implemented. As such, similar reference numerals will be used to indicate such similar features or steps.

Referring now to FIG. 2A, a first step 200 generally involves obtaining raw data measurements associated with a given tire or set of tires (for example, as obtained by measurement machine 12 of FIG. 1). In one example, the tire is rotated at a generally high speed, such as one that would correspond to a typical highway speed. For present purposes, a "high speed" at which various measurements are obtained and analyzed corresponds to a rotating speed of at least about 600 rpm (about 10 Hz). In other examples, such relatively high rotating speeds are between 10 Hz and 30 Hz (1800 rpm) or higher (e.g., 800 rpm in one particular embodiment). In still further examples, the tire may be rotated at a "low speed" of less than about 10 Hz (600 rpm). It should be appreciated that each set of measurements may include measurements at one or more tracks along the surface of a tire. In one example, a range of two to five different tracks are used to provide better overall tire predictions.

In an effort to increase measurement quality in step 200, a number of optional quality control steps may be implemented. For example, it may be preferred to provide measured tires in a stabilized position for a certain minimum amount of time before being mounted and measured by a measurement machine. Laying tires on a flat surface for some time may help minimize or remove distortions due to tire storage, e.g., depressions due to tires resting on pipes from a tire rack. Rims and lug holes associated with mounting fixture 18 are preferably clean and lubricated before tire mounting, and may be without mounting humps. Appropriate warm-up for electronic modules within the measurement system, such as the laser sensors 22, may be conducted. The centrifuge portion of the measurement machine 12 may also be initially operated without measurement for a predetermined amount of time at a certain high speed to help ensure good seating of the measured tire on the rim associated with mounting fixture 18. It may be desirable to have time delays between tire measurements at different speeds and among different measured tires. Initial calibration data may also be obtained before measurement data are obtained and used to implement such end process results as grading, sorting, tire modification or process adjustments. The subject filtering techniques may be applied to measurement data or to such initial calibration data.

Figure 5A:
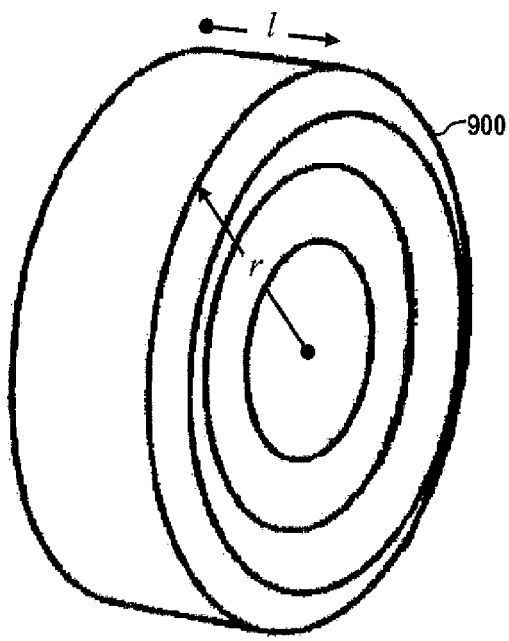
FIG. 5A provides a perspective representation of a tire depicting exemplary radial (r) and lateral (l) directions for geometrically modeling certain tire parameters.

As previously discussed, one exemplary geometric tire measurement that may be obtained in accordance with embodiments of the present invention corresponds to radial run-out. With reference to FIG. 5A, which depicts the lateral (l) and radial (r) directions of a tire 900, it should be appreciated that radial run-out values obtained or determined by a measurement system are generally obtained in the radial direction (r) depicted in such figure. Another exemplary geometric tire measurement corresponds to lateral run-out. With reference to FIG. 5A, lateral run-out values may be obtained or determined along a tire shoulder or sidewall to measure variations in the lateral direction (l). Radial and lateral run-out values may be obtained and analyzed separately or in combination to determine various aspects of geometric tire properties and related parameters.

Figure 5B:
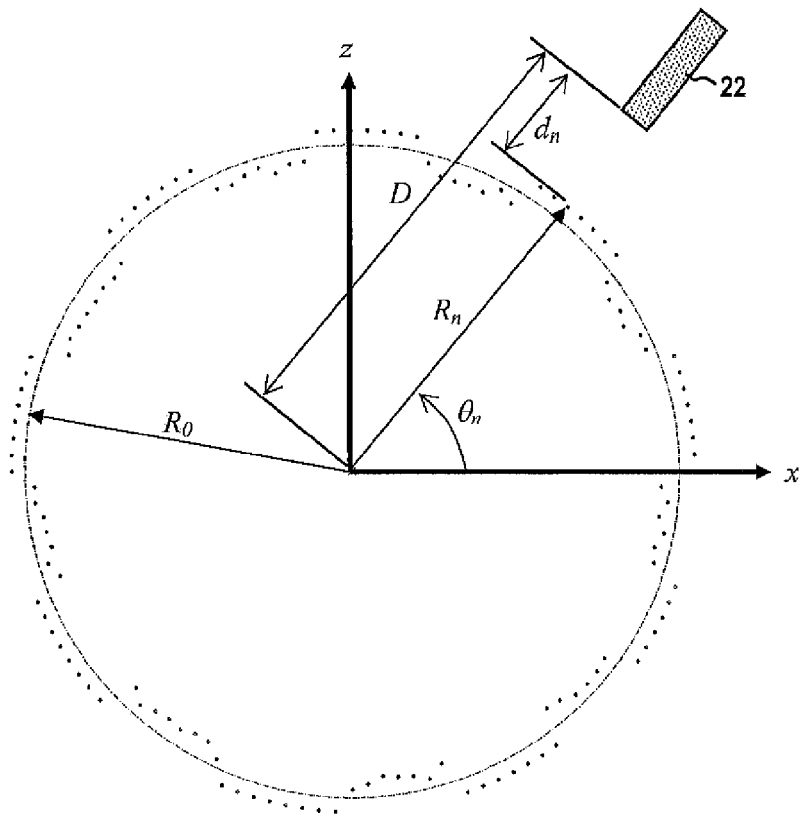
FIG. 5B provides a plan representation of the radial periphery of a tire depicting exemplary first and second orthogonal dimensions and associated measurement references for geometrically modeling certain tire parameters.

The manner in which radial run-out measurements may be obtained, such as by laser sensors 22 and related components illustrated in FIG. 1, can be better appreciated by reference to FIG. 5B. The generally circular dashed line in FIG. 5B is intended to represent a nominal radius ($R_0$) of a tire, as will be determined or defined as described herein. Laser sensor 22 is positioned relative to the tire surface and is configured to measure the displacement distance ($d_n$) at different respective angular positions ($\theta_n$) between the tire surface and laser sensor 22 at a plurality of index points n=1, 2, 3, ... N around the tire. In one example the total number of points N=2048 data points, although any number can be used. When laser sensor 22 is provided in a fixed location relative to the tire, the dimension D in FIG. 5B represents the distance between the axis of rotation and the laser.

Additional quantities can be calculated from the obtained displacement measurements. For example, a tire surface measurement ($R_n$) can be determined at each point n by using the formula: $R_n = D - d_n$. A nominal radius ($R_0$) for the tire can then be determined by calculating the average of all surface measurements using the formula:

$$R_0 = \frac{1}{N} \sum_{n=1}^{N} R_n.$$

Alternatively, radius ($R_0$) may simply be a fixed value predetermined and provided as user input to the subject computer processing equipment. The run-out ($u_n$) at each point n, or deviation in the tire's surface from a uniform circle represented by $R_0$, can then be calculated by the formula: $u_n = R_n - R_0$.

For lateral run-out measurements, the laser sensor 22 is still positioned relative to the tire surface to measure the displacement distance ($d_n$) at different respective angular positions ($\theta_n$) between the tire surface and laser sensor 22. However, variations in distance along a tire sidewall or shoulder are not necessarily computed relative to the nominal radius of the tire as it is for radial run out measurements. Instead, $R_0$ is simply a predetermined value that remains fixed (i.e., a selected constant value) for the analysis of a particular set of lateral run-out measurements. It has been proven that the successful identification of sidewall deformation associated with lateral run-out measurements is sufficiently insensitive to the choice of a selected radius value ($R_0$). In one example, a selected constant value for $R_0$ may be chosen from a range identified by the nominal tire radius times a constant x, where $\frac{1}{8} \leq x \leq 5$. In other examples, different ranges of x may be possible.

The raw data (e.g., $d_n$ values) and/or associated derivative measurements described above (e.g., $R_n$ and/or $u_n$ values) may then be provided to computer(s) 42 and associated processor(s) 44 for post-measurement processing. Such processing may generally include such exemplary steps as data conditioning 202, data filtering 210, and other prior or subsequent measurement, analysis and other steps performed in conjunction with data conditioning and filtering. The data filtering process 210 is of particular interest to the system and method of the present subject matter, since this portion of post-measurement processing serves to filter out certain geometric features of a tire. Filtering 210 generally includes an optional step 212 of performing an erosion pre-filter to remove data spikes caused by tread flashing, laser overshoot and the like, step 214 of transforming measured data into two-dimensional form, step 216 of capturing data points lying on a convex hull surrounding the data points and step 218 of interpolating the remaining data points in one dimension. It should be appreciated that some of the steps, including the data filtering steps 210 do not necessarily need to be performed in the sequential ordering shown in FIGS. 2A-2C.

Before discussing the improved data processing steps of the present invention in further detail, filter performance using conventional window-based filtering techniques are discussed relative to FIGS. 3, 4A and 4B. Such conventional techniques, including moving average and median filtering, generally consist of a mathematical process in which a window surrounds a raw data point of interest and assigns a filtered value based upon a measure of central tendency, typically a mean or median, of raw data points within that window. When the central tendency measurement is the mean, the filter is termed a moving average filter.

Consider the following one-dimensional functional forms of raw run-out measurement data:

$$r = g(\theta); \; r_n = g(\theta_n); \; \text{and} \quad (1)$$

$$f = h(\theta); \; f_n = h(\theta_n), \quad (2)$$

where r and f denote the raw measurement and filtered measurement, respectively, in terms of a radial coordinate and $\theta$ is the circumferential coordinate of a run-out data point. When N total data points are measured about a tire's periphery, indexed by an integer n such that n=1, 2, 3, ..., N, $\theta_n$ refers to the angular position at each measurement point n. When the measurements are obtained with substantially uniform angular spacing around the radial periphery of a tire, the formula $\theta_n = 2\pi(n-1)/N$ may be used. In judicial notation, the median and moving average filters are expressed as $$f_n^{median} = \text{median}\{r_{n-w/2} \ldots r_{n+w/2}\} \quad (3)$$

$$f_n^{moving \; avg} = \text{mean}\{r_{n-w/2} \ldots r_{n+w/2}\} \quad (4)$$

where w is the number of data points in the window.

FIG. 3 shows a simulated 128-point radial run-out measurement for a 9-pitch tire having a nominal radius of 300 mm and tread groove depth of 13 mm. In addition, a sinusoidal run-out of peak-to-peak magnitude 2.0 mm has been superimposed in the raw data; it is precisely this run-out that is desired to be detected after all data processing is complete. The simulated data points are represented by the respective dot-like points on the graph. FIG. 3 also shows the corresponding median and moving average filter, each using a 15° window. The median filter is represented by the solid line and the moving average filter is represented by the dashed line. Decomposing the median and moving average filtered data yields first harmonic run-out (H1) values of 2.93 mm and 2.56 mm, respectively, or 1.28 to 1.46 times larger than the actual value.

FIGS. 4A and 4B show the normalized first harmonic run-out (H1) magnitude and phase angle, respectively, of the median and moving average filters as a function of window size. In particular, the graph of FIG. 4A provides a ratio of the filtered first harmonic run-out (u) magnitude to the actual first harmonic run-out magnitude ($u_0$) versus window size in degrees. FIG. 4B graphs the difference between the actual first harmonic run-out phase and the filtered first harmonic run-out phase ($\Delta\theta$) in degrees versus window size in degrees. In both FIGS. 4A and 4B, the solid line on the graphs represents the median filter, and the dashed line represents the moving average filter. The results show errors in detecting the correct magnitude and phase. Based on this example, it is generally apparent that window-based filters alone are not always effective for filtering tire measurement data and may introduce significant spurious harmonic content. As such, improved data processing techniques have been developed.

Additional conditioning steps initially may be applied to obtained or determined run-out measurements before application of the subject filtering techniques. For example, referring again to FIG. 2A, a first step associated with a data conditioning process 202 involves an averaging step 204 whereby the different measurement points across the total number of tire revolutions at which measurements are taken are averaged together. For example, if tire measurements are obtained for 60 tire revolutions, each of the 60 measurements associated with a given data point (one for each 2048 or other total number of data points) may be averaged. This data averaging not only helps achieve overall better measurement quality, but also helps minimize data storage requirements for the measurement data.

Another exemplary step 206 in data conditioning process 202 involves synchronizing raw measurement data (e.g., run-out measurements). Synchronizing step 206 generally involves synchronizing all measured data points (e.g, 2048 points measured around the surface of a tire) with the index pulse, which is the reference point determined by optical encoder 34. The implementation of a phase or timing shift may be desired to appropriately align data points with a reference location along the tire surface when there is a timing shift due to internal filtering associated with laser sensors 22. The amount of timing/phase shift is often determined as a function of the rotation speed at which tire measurements are obtained.

It should be appreciated that the above-described data conditioning steps, including but not limited to synchronizing and averaging steps 204 and 206, respectively, may be performed on any of the different types of geometric measurements described with reference to FIG. 5B. For example, data conditioning steps may be applied to the data set of displacement distance values $\{d_n: n=1, 2, \ldots N\}$ measured between the laser sensor and tire surface, to the data set of determined radial or lateral surface measurements $\{R_n: n=1, 2, \ldots N\}$ or to the data set of determined radial or lateral run-out measurements $\{u_n: n=1, 2, \ldots N\}$. As such, data conditioning may occur before, during or after the process of converting displacement distance measurements to radial or lateral surface values and/or run-out values.

Referring now to FIG. 6A, an exemplary graph of a conditioned data set of radial surface measurements ($R_n$) measured at various angular positions ($\theta_n$) around a tire is illustrated, where each dot-like data point represents one of the N total discrete radial surface values and the dashed line represents $R_0$, the nominal radius of the tire. As previously described with reference to FIG. 5B, the radial surface measurements of FIG. 6A can be converted into run-out values (u), such as shown in FIG. 6B.

An exemplary plot of a conditioned data set of run-out measurements (u) measured in mm versus angular position ($\theta$) measured in degrees is provided in FIG. 6B, where each dot-like point represents one of N total measurements. It can be appreciated from such figure that the measured data sometimes include imprecise values due to the interaction of the measurement process with certain geometric tire features, such as but not limited to defined grooves in a tire tread and the presence of tire flashing (i.e., thin portions of excess rubber that extend from an otherwise substantially smooth outer surface of a tire tread).

In particular, in the case of a non-contact measurement system capturing tread run-out measurements along a tire crown, radial run-out measurements along the top of the tread (i.e., the tread ridges) are often captured rather precisely. These measurements appear as the data points with run-out values between about 5 and 8 mm in FIG. 6B. However, the data obtained at bottom tread groove locations often contain significant noise, appearing as the scattered data points having a negative run-out value. Additional noise may be introduced by generally sparse incorrect data readings based on laser overshoot or other spurious effects or to run-out measurements obtained along a tire surface where geometric features such as tread flashing are present. Such additional noise often presents itself graphically as upward data spikes, such as data points 601-608, respectively, of FIG. 6C.

Because raw run-out data are often difficult to filter effectively using conventional window-based techniques such as moving average and median filtering, the present subject matter describes improved data filtering steps (generally 210 in FIGS. 2A-2C) that provide for effective, automatic, and natural filtering of the data, by compensating for spurious tire tread features.

A first exemplary step associated with the data filtering process 210 of the present invention involves performing an erosion pre-filter step 212. Step 212 may be optional in the sense that it is needed only when upward data spikes are present, such as may be introduced by the presence of tread flashing or when analyzing inverted data to detect sidewall depressions or other geometric parameters. Pre-filter step 212 generally involves identifying and eliminating or modifying selected run-out measurements that spike above adjacent measurement values. The elimination of data spikes becomes important in subsequent processing steps associated with convex hull filtering. As will be appreciated from subsequent explanation of convex hull filtering, if such data spikes are otherwise included in a measurement set instead of being filtered out or eliminated, these spikes would be identified as lying on the convex hull and could undesirably introduce spurious lower spatial frequency content into the measurement data.

Referring now to FIGS. 6C and 6D, consider the exemplary case where upward-going spikes—corresponding to tread flashing—exist in the data as shown in FIG. 6C. FIG. 6C provides a representation of run-out (u) measured in millimeters (mm) versus angular position measured in degrees (°). All measured data points in FIG. 6C are represented by the dot-like points on the graph, and the generally sparse upward data spikes are labeled in FIG. 6C as data points 601-608, respectively. Thus, in accordance with step 212 of FIG. 2A, a pre-filter may be desired to eliminate or modify the data points 601-608.

In one exemplary embodiment, identified data points above a certain value or that are identified to spike above adjacent measurement values (e.g., data points 601-608) can simply be deleted or replaced by a minimum or average value of selected adjacent data points. In another example, an erosion-type filter may be applied to all data points, with the most obvious changes affecting the run-out values corresponding to data points 601-608. In accordance with such an erosion filter, a window-based method may be applied in which all data points are filtered by replacing each point with the minimum of all the points in a specified window, based on the following equation:

$$f_n^{erosion} = \min\{u_{n-w/2} \ldots u_{n+w/2}\} \tag{7}$$

In one example, the specified window is three points. As such, a data value associated with a target point is replaced with the minimum of three values including the target point and the points immediately to the left and right of the target point. It should be appreciated that multiple iterations of an erosion pre-filter such as described with reference to step 212 (e.g., one, two, three or more passes of the measured data through the erosion pre-filter) could be implemented.

Referring now to FIG. 6D, a graphical illustration is provided of measured data points after application of an erosion filter as defined in equation (7) above. FIG. 6D also provides a representation of run-out (u) measured in millimeters (mm) versus angular position measured in degrees (°). All data points are filtered causing some original data points, including the spiked data values 601-608 and others, to now appear as points with negative run-out values, often clustered next to adjacent measurements corresponding to tread groove locations. By employing a narrow window, the erosion filtering process tends to effectively remove upward-going spikes, but increases the widths of the grooves. As shown in FIG. 6D, a window of approximately 8° (three data points) eliminates tread flashing. It should be appreciated that although the above pre-filtering step 212 is described as applied to a data set of run-out values $\{u_n\}$, pre-filtering may also be applied to a data set of radial surface measurements $\{R_n\}$.

While pre-filtering step 212 is helpful to eliminate geometric features such as tread flashing, additional filtering is needed to compensate for the presence of tread ridges and/or grooves. Such additional filtering is accomplished in part by application of a convex hull filter. However, a two-dimensional data set may be preferred to effectively perform convex hull analysis. As used herein, tire measurements referred to as "one-dimensional" generally correspond to geometric measurements obtained in terms of a single vector quantity. For example, when run-out measurements are obtained in polar form (in terms of radial and circumferential coordinates), only a single vector is used to define such measurement. In contrast, tire measurements referred to herein as "two-dimensional" generally require two vectors to represent the run-out measurements. An example of a two-dimensional run-out measurement corresponds to one defined by Cartesian coordinates which require respective first and second magnitudes in different orthogonal directions, thus consisting of two different measurement vectors.

Figure 7:
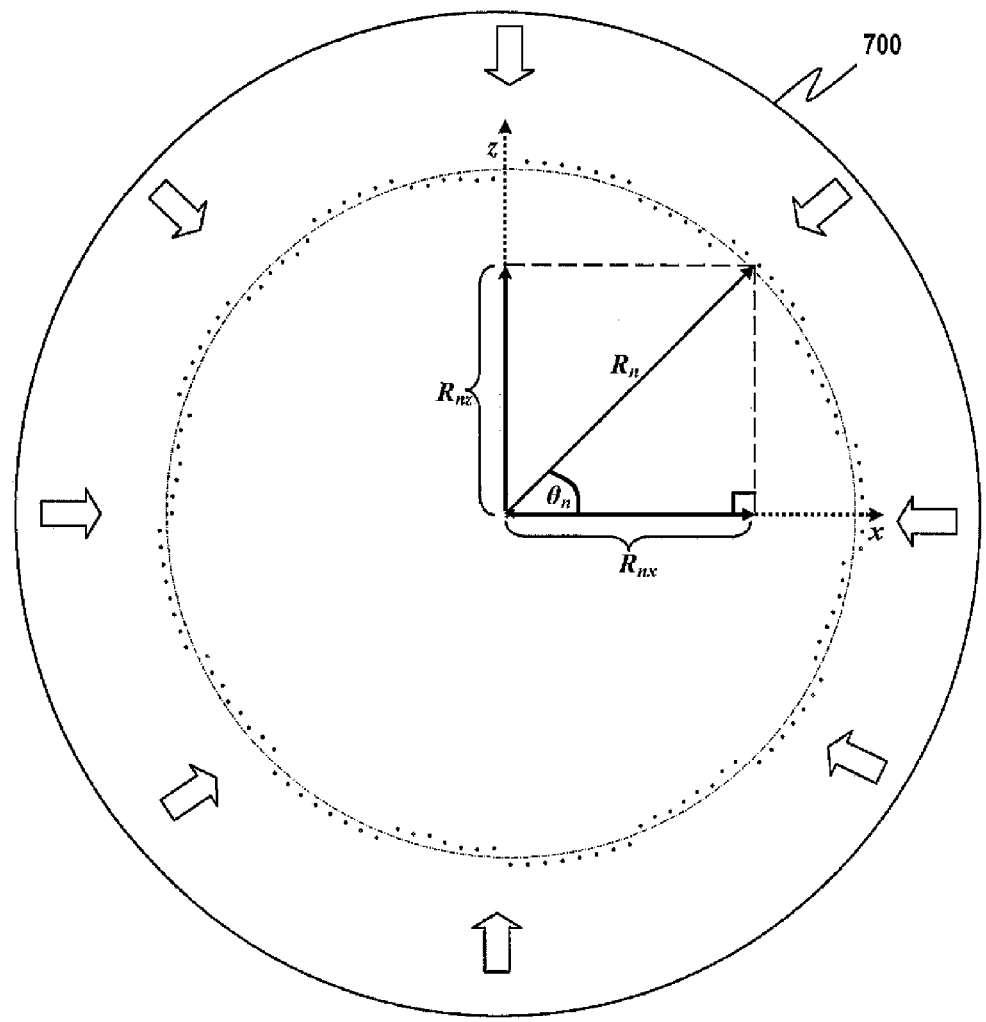
FIG. 7 provides a graphical illustration conceptualizing an exemplary convex hull algorithm for use in an exemplary embodiment of the present invention, particularly depicted as points upon which an elastic band, relaxing from an infinitely stretched state, would rest in equilibrium.

In accordance with another exemplary step of the data filtering process 210 in FIG. 2A, step 214 involves transforming the one-dimensional data such as illustrated in FIG. 6D into two-dimensional form, thus considering the inherent curvature of the tire surface. In accordance with transforming step 214, each run-out value ($u_n$) from FIG. 6D is converted back to a radial surface measurement ($R_n$) and decomposed into two-dimensions as shown in FIG. 7. An example of such two-dimensional transformation involves utilization of an orthogonal coordinate system having a set of mutually perpendicular axes. A specific example of two-dimensional representation transforms each radial surface measurement $R_n$ into respective coordinates $R_{nx}$ and $R_{nz}$, where $R_{nx}$ is the 2-D measured data point value in a first dimension (e.g., fore-aft dimension x) and $R_{nz}$ is the 2-D measured data point value in a second dimension (e.g., vertical dimension z). Specific equations for implementing the transformation of the measured data from one-dimensional to two-dimensional form are as follows:

$$R_{nx} = R_n \cos \theta_n; \text{ and} \tag{5}$$

$$R_{nz} = R_n \sin \theta_n. \tag{6}$$

Referring again to FIG. 2A, another more particular step in the data filtering process 210 involves a step 216 of identifying selected ones of the 2-D radial surface measurements that lie on a convex hull encompassing the 2-D measurements. Step 216 may more particularly involve determining the subset of points that forms the vertices of the smallest convex geometric shape to encompass the set of 2-D measurements.

Figure 8A:
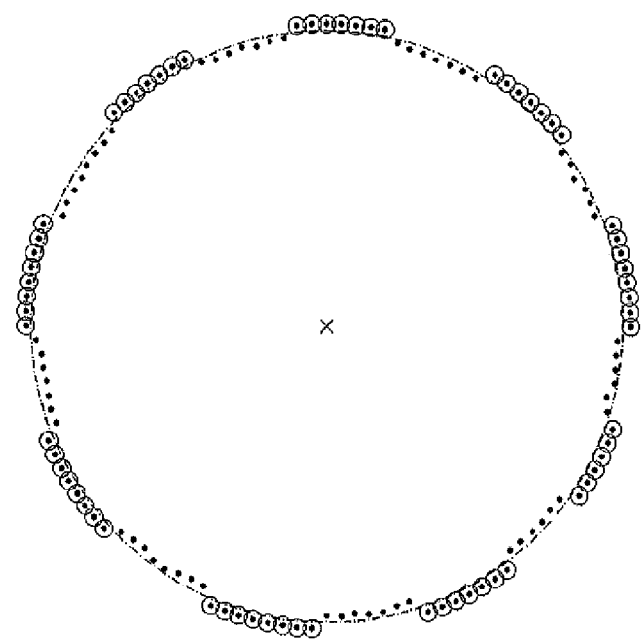
FIG. 8A provides a graphical representation of an exemplary data set of two-dimensional run-out measurements with selected data points identified as being located on the convex hull associated with such data points in accordance with an exemplary embodiment of the present invention.

Such determination in a planar context can be represented graphically as shown in FIG. 7. The convex hull can be conceptualized as the points upon which a hypothetical elastic band 700, relaxing from an infinitely stretched state, would rest if it were to reach equilibrium. Given a set of data points such as shown in FIG. 7, a convex hull is thus the minimum polygon enveloping these points such that all the points are either on the perimeter or inside the polygon. The polygon must be convex such that the convex hull will be represented only by those perimeter points, leaving out any inward spikes. The remaining data points, i.e., those lying on the convex hull, are identified as shown in FIG. 8A as the circled data points lying outside the dashed-line circle representing nominal radius $R_0$. The number of remaining data points is thus greatly reduced from the initial set of measured points.

There are several well-known mathematical algorithms to compute the convex hull of a planar set. For example, a practical convex hull algorithm that employs the two-dimensional Quickhull algorithm with or without a general-dimension Beneath-Beyond Algorithm is disclosed in "The quickhull algorithm for convex hulls," by C. Bradford Barber et al., *ACM Transactions on Mathematical Software (TOMS)*, Vol. 22, No. 4, December 1996, pp. 469-483. Additional explanations of known convex hull algorithms are disclosed at http://www.qhull.org/ and http://mathworld.wolfram.com/ConvexHull.html.

Alternatively, methods such as the so-called "gift-wrapping" method may be used for implementing a convex hull algorithm. In accordance with gift-wrapping techniques, analysis starts from the farthest point in a given quadrant, for example the lowest, left-most point within a data set. Such point is guaranteed to be on the convex hull enveloping the data set. A next point on the convex hull is identified such that no points lie to the left of the line created by the current point and the next point. This process is repeated until it wraps back around to the original point.

Figure 8B:
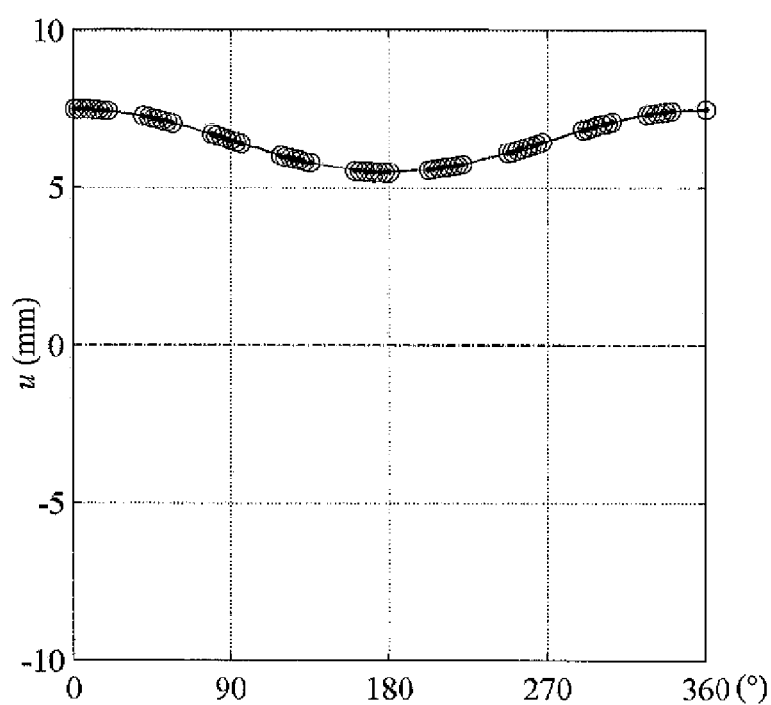
FIG. 8B provides a graphical representation of an exemplary filtered data set after performing a one-dimensional interpolation of selectively identified two-dimensional run-out measurements that are located on the convex hull in FIG. 8A in accordance with an exemplary embodiment of the present invention.

Referring yet again to FIG. 2A, a final step 218 involved in the exemplary data filtering process 210 corresponds to performing a one-dimensional interpolation of the identified selected ones of the 2-D measurements that lie on the convex hull. Such identified 2-D measurements lying on the convex hull are represented by the circled data points in FIG. 8A. In order to perform one-dimensional interpolation, the identified circled data points in the two-dimensional data set of radial surface measurements shown in FIG. 8A are converted back to a one-dimensional data set of run-out measurements as shown in FIG. 8B. The circled data points in FIG. 8B are the only remaining data points on the graph since they were the only ones determined to lie on the convex hull. Once the identified data points are in one-dimensional form, interpolation step 218 is used to fill in the identified gaps between the data points on the graph.

With more particular regard to step 218, the data points identified as falling on the convex hull in step 216 (e.g., the circled data points in FIGS. 8A and 8B) are converted from 2-D form back to 1-D form in terms of respective run-out values at various angular positions, as shown in FIG. 8B. An interpolation of the data points is then performed as denoted by the solid-line in FIG. 8B. In general, the interpolation corresponds to a step of mathematically constructing new data points among the discrete set of identified data points lying on the convex hull. The result may correspond to a substantially continuous function based on the total series of previously identified and newly constructed data points. Any suitable type of interpolation may be utilized, and non-limiting examples include linear interpolation, polynomial interpolation, spline interpolation and the like. In a particular example, a type of spline interpolation referred to as cubic spline interpolation may be employed whereby a series of third order polynomials enables a fit at each existing data point by determining where first and second derivates match at each point.

A still further example of interpolation that may be implemented in step 218 is referred to herein as "fill interpolation." Fill interpolation interpolates between first and second existing data points by filling in the missing values between such points with the minimum of the two existing data points. For example, if a first point measured at position five (5) has a value of seven (7.0) and a second point measured at position ten (10) has a value of fifteen (15.0), fill interpolation would assign values for positions 6, 7, 8 and 9 of seven (7.0), the minimum of (7.0) and (15.0).

Referring still to FIG. 2A, a Fourier or harmonic decomposition of the resulting function obtained after application of the convex hull filter in step 218 is performed in step 220. It is significant to note that the subject filtering techniques are generally successful in effectively reproducing the first harmonic (H1) radial run-out magnitude and phase with a very low percentage of error, while at the same time not introducing undesirable noise or error levels in the other harmonic components (e.g., H2, H3, H4, etc.). This is a notable advantage over other data filtering techniques, which sometimes introduce inadvertent errors in higher level harmonic components of a geometric tire measurement when first level or other low level harmonic components are filtered.

Based on the exemplary data illustrated in FIG. 8B, the convex hull filter effectively reproduces the H1 magnitude and phase within 1.4% and 0.26°, respectively. Based on the same exemplary data of FIG. 8B, the resulting Fourier magnitudes and phases after application of the subject convex hull filter when no upward data spikes are present in the raw measurement data (thus NOT requiring application of an erosion pre-filter) are presented in Table 1.

TABLE 1

Fourier magnitudes and phases with convex hull filter and no erosion pre-filter

| Harmonic: | Magnitude (mm): | Phase (degrees): |
|---|---|---|
| H1 | 1.9868 | 0.0010 |
| H2 | 0.0012 | 171.0934 |
| H3 | 0.0018 | 12.2178 |
| H4 | 0.0015 | 51.4508 |

Based on the exemplary data illustrated in FIG. 8B, the resulting Fourier magnitudes and phases after application of the subject convex hull filter when there are spikes present in the raw measurement data (and thus an erosion pre-filter is applied) are presented in Table 2.

TABLE 2

Fourier magnitudes and phases with convex hull filter and erosion pre-filter

| Harmonic: | Magnitude (mm): | Phase (degrees): |
|---|---|---|
| H1 | 1.9714 | 0.2591 |
| H2 | 0.0357 | 178.8306 |
| H3 | 0.0094 | 13.7237 |
| H4 | 0.0086 | 10.3163 |

A final step 230 (which may be implemented either before or after Fourier decomposition step 220) involves providing output data to a user or process control. As previously described, output data could be provided to a display or printed as output so that a user can model and/or analyze certain aspects of a tire, for example by capturing a "best-fit" slick-tire profile in the meridian plane, a three-dimensional hypothetical torus shape of a tire, or tread deformations of tires. Output data can also be used to sort or grade tires, or to modify tires by adding mass or grinding mass or by altering the tire building process, as disclosed in U.S. Pat. No. 7,082, 816 (Zhu), which is incorporated herein by reference for all purposes. Other applications for the disclosed technology may be appreciated by one of ordinary skill in the art.

Referring now to FIGS. 2B and 2C, methods are depicted for applying the disclosed data filtering techniques specifically to lateral run-out measurements obtained along a tire sidewall or shoulder location. Many of the same steps illustrated in and discussed with reference to FIG. 2A apply, and are indicated with the same reference numerals. However, slight variations may exist. For example, the methods set forth in FIGS. 2B and 2C do not include step 220 of performing Fourier decomposition since sidewall deformation detection associated with lateral run-out measurements do not require the same harmonic analysis of uniformity parameters associated with radial run-out measurements.

An additional difference that arises in FIG. 2C concerns the recognition that there may typically be two different traces of data points that can be analyzed for tire surface measurements. When tread features are present along a tire crown, shoulder or sidewall location, the data points measured along the top of such tread features (i.e., the tread ridges) and/or at the bottom of such tread features (i.e., the tread grooves) can be analyzed. The respective sets of data points measured relative to the tread ridge and tread groove locations are referred to herein as the top trace and bottom trace data, respectively. The process described above relative to FIG. 2A describes analysis of the top trace. Analysis of the bottom trace requires additional data inversion steps, such as described with reference to FIG. 2C. It has been determined for sidewall deformation that analysis of the top trace is sometimes more reliable for identifying potential sidewall projections, while analysis of the bottom trace is sometimes more reliable for identifying potential sidewall depressions. As such, one or both of the top and bottom trace analysis may be implemented via parallel processing paths for a single obtained data set in accordance with the disclosed methodology. Although the possibility of performing data inversion (e.g., steps 211 and 219 in FIG. 2C) is not specifically shown in FIG. 2A, it may be possible to apply the same data inversion techniques and analysis to radial run-out values or other geometric measurements in the process of FIG. 2A. This variation is within the scope of the presently disclosed technology.

Referring more particularly to the option for considering bottom trace data measurements, FIG. 2C includes two additional data inversion steps 211 and 219. The first data inversion step 211 calls for inverting or flipping the data set, for example by multiplying the magnitude of each run-out measurement by negative one (−1), before applying an erosion pre-filter in step 212. After the interpolation of step 218, the data is inverted again (i.e., re-inverted) in step 219 before being subjected to additional analysis or provided as output data to a user.

Figure 9:
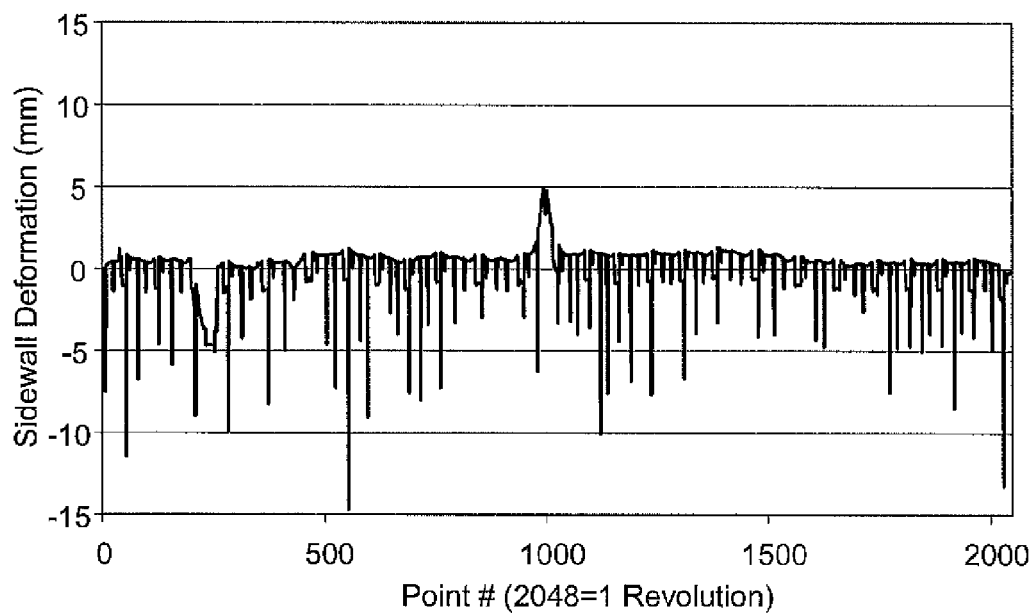
FIG. 9 provides a graphical representation of an exemplary data set of lateral run-out measurements in accordance with an exemplary embodiment of the present invention.

FIGS. 9-18 provide an example of how the top and bottom traces of a data set may be analyzed to identify sidewall projections and depressions that may exist in a set of lateral run-out measurements. All such figures illustrate data points corresponding to various lateral run-out measurements or processed data values that are plotted with location point number along the abscissa and measured deformation in millimeters (mm) along the ordinate. In the particular example set forth in FIGS. 9-18, a single revolution of a tire consists of 2048 data points, as represented along the abscissa. FIG. 9 shows an initial data set of measured lateral run-out values (i.e., sidewall deformation). The initial data set shown in FIG. 9 may be representative of a conditioned data set, for example, measurement data that have been averaged and synchronized according to steps 204 and 206 described herein. It will be generally appreciated from the following data analysis that a sidewall projection of about 5 mm exists at about point 1000 and a sidewall depression of about 5 mm exists at about point 300.

Figure 10:
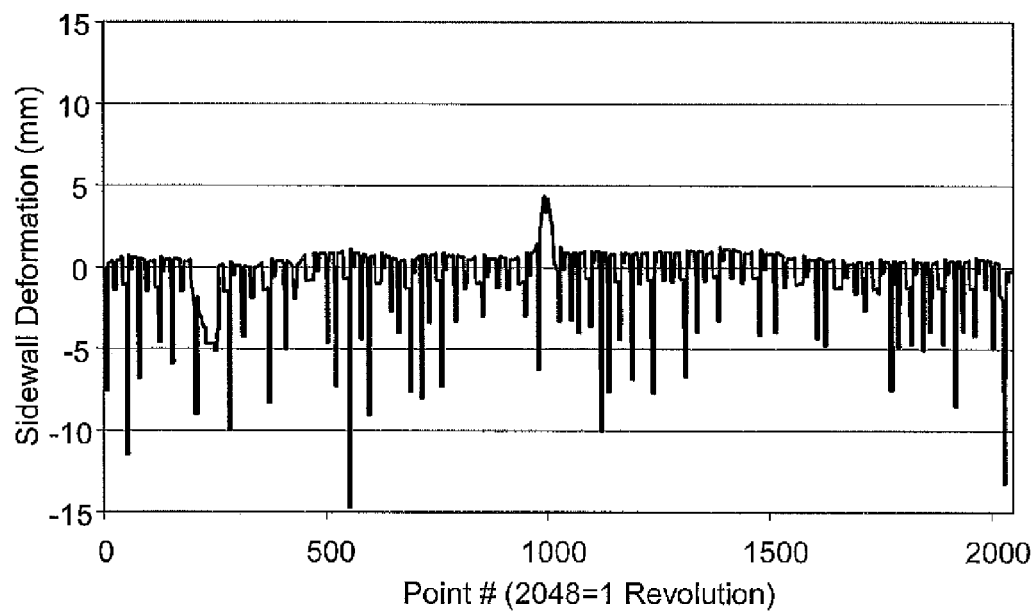
FIG. 10 provides a graphical representation of the exemplary data set of FIG. 9 after the application of an erosion pre-filter in accordance with an exemplary embodiment of the present invention.
Figure 11:
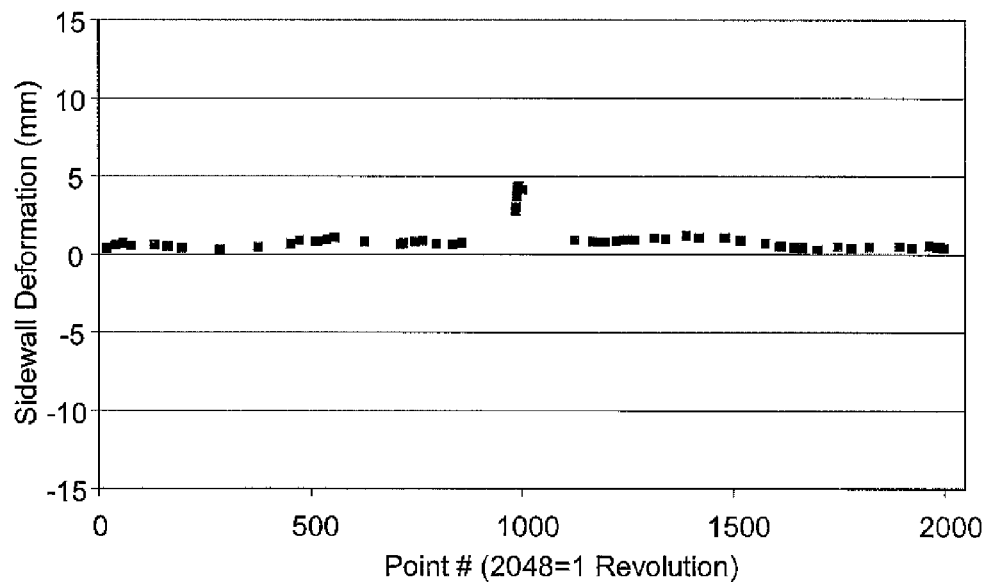
FIG. 11 provides a graphical representation of the exemplary data set of FIG. 10 after the application of convex hull processing in accordance with an exemplary embodiment of the present invention.
Figure 12:
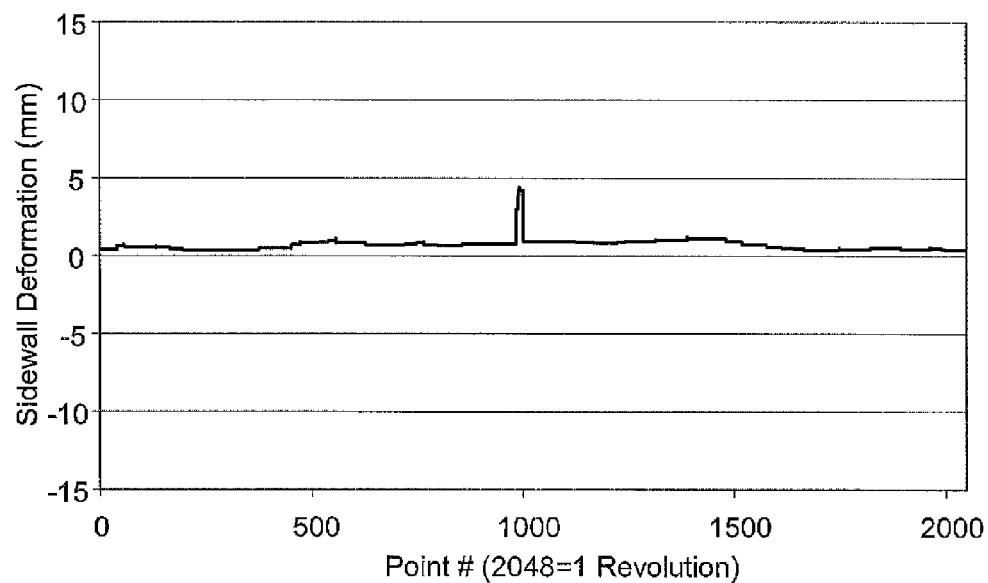
FIG. 12 provides a graphical representation of the exemplary data set of FIG. 11 after the application of interpolation in accordance with an exemplary embodiment of the present invention.

Referring now to FIGS. 10-12, processing of a top data trace (i.e., the measured data points generally corresponding to the top of the tread block or tread features provided on a tire surface) is graphically depicted. FIG. 10 shows the original data set of FIG. 9 after application of a pre-erosion filter such as described in step 212 having a three point data window. FIG. 11 shows the same data set after application of steps 214 and 216, thus illustrating the selected subset of points that are determined to be on the convex hull. FIG. 12 illustrates the data set from FIG. 11 after application of interpolation such as set forth in step 218. In particular, a fill interpolation step is implemented to obtain the continuous data curve represented in FIG. 12. As seen by a comparison of the filtered data set illustrated in FIG. 12 to the initial data set shown in FIG. 9, the detection of a sidewall projection at around point 1000 is much easier to isolate and identify.

Figure 13:
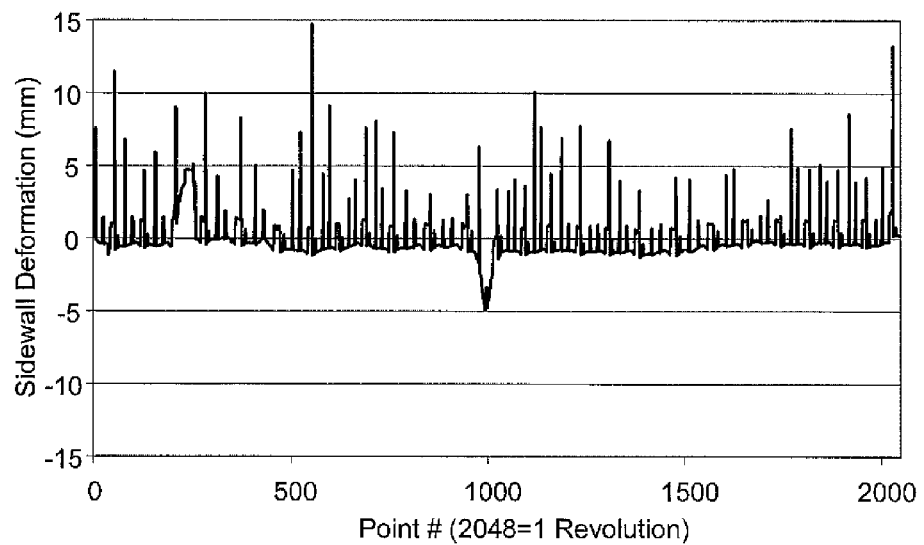
FIG. 13 provides a graphical representation of the exemplary data set of FIG. 9 after data inversion in accordance with an exemplary embodiment of the present invention.
Figure 14:
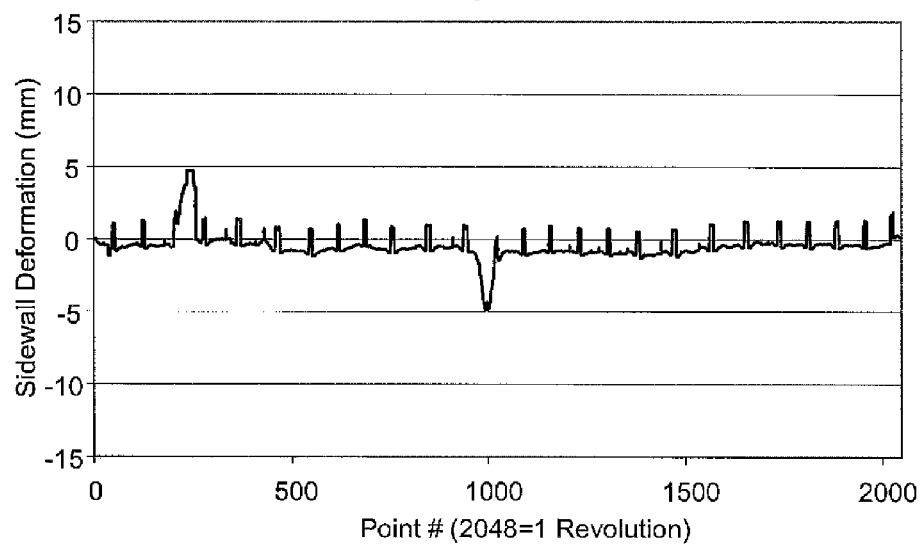
FIG. 14 provides a graphical representation of the exemplary data set of FIG. 13 after the application of an erosion pre-filter in accordance with an exemplary embodiment of the present invention.
Figure 15:
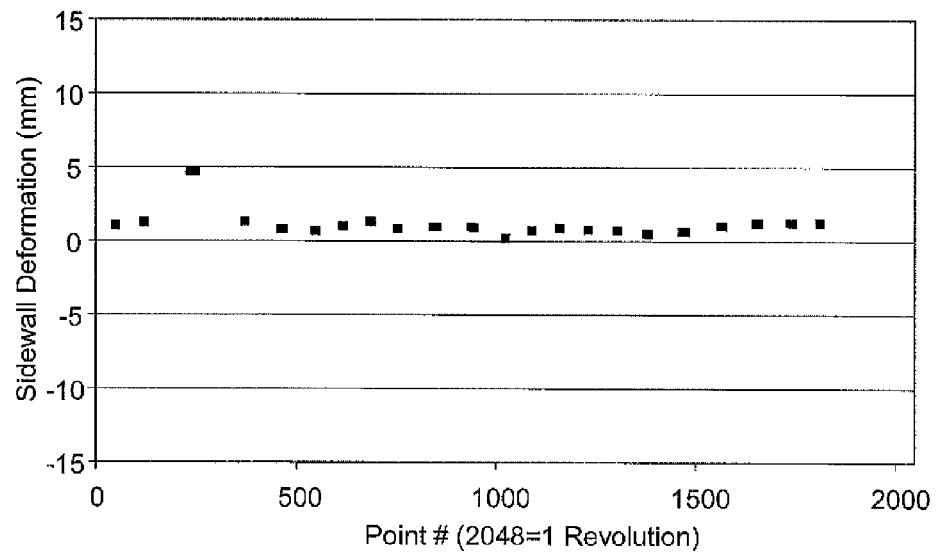
FIG. 15 provides a graphical representation of the exemplary data set of FIG. 14 after the application of convex hull processing in accordance with an exemplary embodiment of the present invention.
Figure 16:
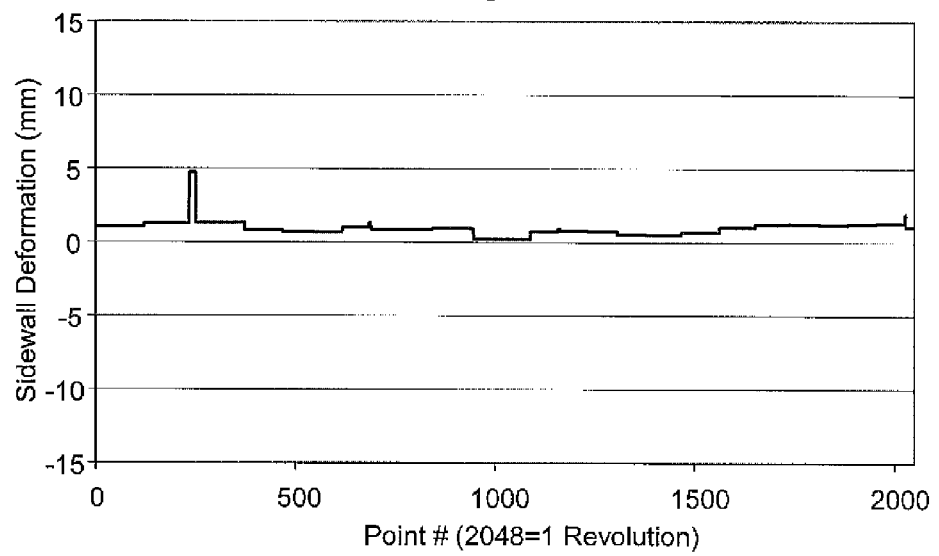
FIG. 16 provides a graphical representation of the exemplary data set of FIG. 15 after the application of interpolation in accordance with an exemplary embodiment of the present invention.
Figure 17:
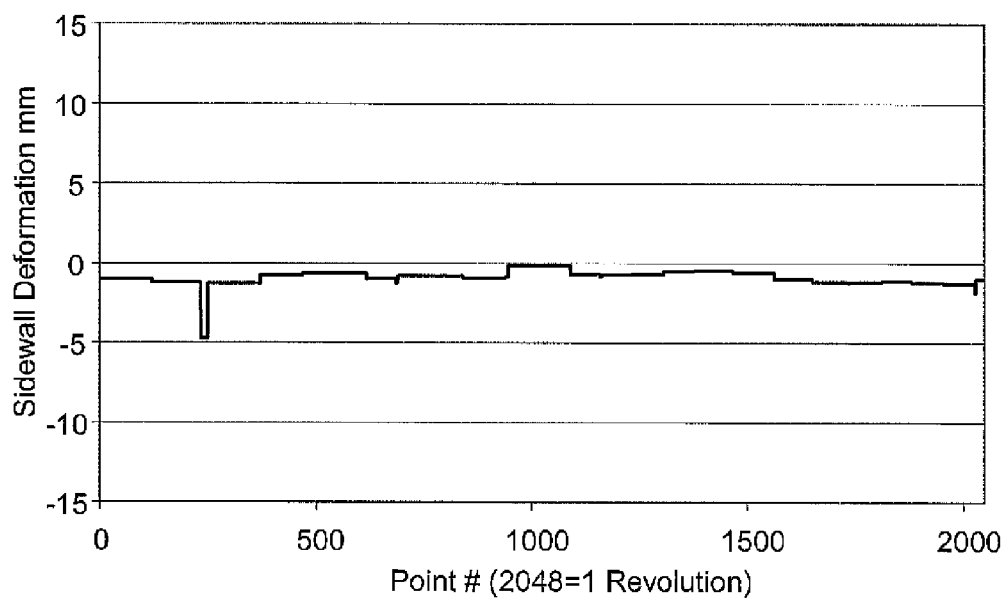
FIG. 17 provides a graphical representation of the exemplary data set of FIG. 16 after application of data re-inversion in accordance with an exemplary embodiment of the present invention.

Referring now to FIGS. 13-17, additional or alternative processing may occur to the initial sidewall deformation data shown in FIG. 9. In particular, the data filtering that takes place in FIGS. 13-17 specifically concerns a bottom data trace (i.e., the measured data points generally corresponding to the bottom of the tread block or tread features provided on a tire surface). FIG. 13 displays the data set of lateral run-out measurements (i.e., sidewall deformation measurements) after application of inversion step 211. In particular, the data set shown in FIG. 9 is multiplied by negative one to obtain the data set shown in FIG. 13. After application of the data set from FIG. 13 to an erosion pre-filter such as described in step 212 having a three-point window and two passes through the filter, a data set as shown in FIG. 14 is obtained. Application of the convex hull determination from step 216 to the data set of FIG. 14 results in a data set as plotted in FIG. 15. FIG. 16 illustrates the data set from FIG. 15 after application of interpolation such as set forth in step 218. In particular, a fill interpolation step is implemented to obtain the continuous data curve represented in FIG. 16. The interpolated data set from FIG. 16 is then re-inverted via step 219 to obtain a final bottom trace data set as shown in FIG. 17. As seen by a comparison of the filtered data set illustrated in FIG. 17 to the initial data set shown in FIG. 9, the detection of a sidewall depression at around point 300 is much easier to isolate and identify.

Figure 18:
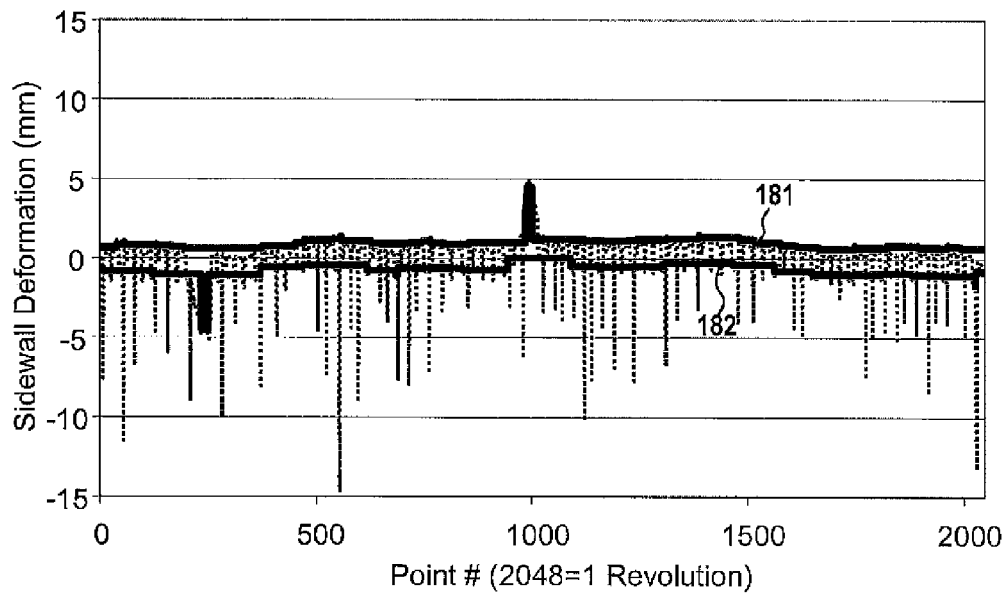
FIG. 18 provides a graphical representation of the exemplary data set of FIG. 9 along with the first and second filtered data sets of FIGS. 12 and 17 showing a comparison of bottom and top traces to an initial set of measurement data.

FIG. 18 provides a clear comparison of how bottom and/or top tread trace data can be helpful depending on which potential sidewall deformation conditions are analyzed. FIG. 18 shows the initial data set from FIG. 9 with the final filtered top data set from FIG. 12 overlayed as plot 181 and the final filtered bottom data set from FIG. 17 overlayed as plot 182. The filtered top data set is clearly better in this particular example for detecting the sidewall projection at about point 1000, while the filtered bottom data set is clearly better in this particular example for detecting the sidewall depression at about point 300.

Referring again to FIG. 1, additional details regarding the exemplary hardware components for use in implementing exemplary systems and methods of the present invention are now presented. With particular reference to laser sensors 22, one exemplary embodiment utilizes non-contact laser displacement sensors that employ optical triangulation as a measuring principle. Each laser sensor includes a laser diode that projects a visible stream of light 24 onto the target surface of tire 10. The light reflected from each target spot is directed through an optical receiving system onto a position-sensitive element. In order to effectively capture image signals, laser sensors 22 may also respectively include an array of charge-coupled devices (CCDs) or a complementary metal-oxide-semiconductor (CMOS) chip with integrated processing/filter features for performing real-time surface compensation (RTSC). As a particular example, an optoNCDT laser sensor such as manufactured and sold by MICRO-EPSILON of Ortenburg, Germany may be used.

In another example, one or more sensors 22 may correspond to a laser sensor configured to emit a sheet of light as opposed to a single stream or fixed point of light. Such laser systems are sometimes referred to as sheet-of-light laser (SL) systems and are capable of measuring a meridian plane along the tire surface at one time instead of requiring multiple fixed point (FP) lasers operating together.

The positioning of laser sensors 22 may be varied in accordance with desired measurement tracks along a tire surface. If laser sensors 22 are mounted relative to a platform 26, the positioning of such platform 26 may be altered based on input to a laser control module 28 such that the platform 26 is capable of being moved along a lateral track 30 by motor 32. The platform 26 may also be moved in an angular position relative to a tire 10 so that inward adjustment of the laser sensors 22 can occur for optimum measurement ranges. The relative positioning of the laser sensors 22 on the platform 26 may be fixed or moveable by similar inputs to laser control module 28. In one example, the three laser sensors 22 are aligned in multiple adjacent tread ribs along the radial periphery of tire 10. Even if fewer laser sensors 22 are provided than number of tread ribs in a tested tire, measurements can still be obtained for each identified rib by moving the laser sensors to different lateral positions.

It should be appreciated that although laser control module 28 is illustrated in FIG. 1 as a single, separate component from the laser sensors 22, multiple such controllers may be provided (e.g., one per laser sensor). Alternatively, one or more laser control modules may actually be included as part of the laser sensors 22 instead of being provided separately.

Referring still to FIG. 1, additional system modules coupled to laser sensors 22 include an optical encoder 34 and a data acquisition device 36. Such modules may be directly connected to the laser sensors or indirectly connected to the sensors, such as through the laser control module 28 or other intermediate interface modules.

Optical encoder 34 may include multiple data channels to help coordinate the timing of tire measurements by the laser sensors 22. For example, one channel may provide a control signal adapted to define a plurality of data points per tire revolution, while another channel provides a control signal adapted to provide a once per revolution index pulse to synchronize data to a reference point on the tire. In one particular example, optical encoder 34 is configured to define more than a thousand points per revolution (e.g., 2048 points) for obtaining tire measurements. It should be appreciated that this should not be an unnecessarily limiting aspect of the present invention, as a greater or fewer number of data points may be used. One example of an optical encoder for use with the present technology corresponds to a Model H20® Incremental Encoder such as offered for sale by BEI Industrial Encoders (IED) of Goleta, Calif., USA, an operation of Custom Sensors & Technologies (CST).

The data acquisition device 36 shown in FIG. 1 may be provided as an intermediate storage location for efficiently capturing sets of tire measurement data obtained by the laser sensors 22 and coordinated by the optical encoder 34. Data acquisition device 36 preferably records information associated with the once per revolution index pulse as well as timing information for each of the plurality of measurement data points per tire revolution as defined by optical encoder 34. To accomplish such data storage, one embodiment of data acquisition device 36 more particularly includes an analog-to-digital (A/D) converter 38 and a memory/media element 40 for storing the converted digital form of raw measurement data. In other examples, data acquisition device 36 may include operating software adapted to configure the device, acquire and store data in a predetermined file type, such as ASCII files or other suitable or future-developed file types. In addition, an interface may be available for set up and display of real-time data in waveform format or other data display. In one particular embodiment, an exemplary data acquisition device 36 is a Wavebook brand acquisition system such as offered for sale by IOTech® of Cleveland, Ohio, USA.

Measurement post-processing and filtering may be conducted by one or more computers 42, which may respectively contain one or more processors 44, although only one computer and processor are shown in FIG. 1 for ease and clarity of illustration. Post-processing and filtering functionality may alternatively be implemented by one or more servers 46 or across multiple computing and processing devices. In general, processor(s) 44 and associated memory/media elements 48a, 48b and 48c are configured to perform a variety of computer-implemented functions (i.e., software-based data services).

At least one memory/media element (e.g., element 48b in FIG. 1) is dedicated to storing software and/or firmware in the form of computer-readable and executable instructions that will be implemented by the one or more processor(s) 44. Other memory/media elements (e.g., memory/media elements 48a, 48c) are used to store data which will also be accessible by the processor(s) 44 and which will be acted on per the software instructions stored in memory/media element 48b. The various memory/media elements of FIG. 1 may be provided as a single or multiple portions of one or more varieties of computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others. Although FIG. 1 shows three separate memory/media elements 48a, 48b and 48c, the content dedicated to such devices may actually be stored in one memory/media element or in multiple elements. Any such possible variations and other variations of data storage will be appreciated by one of ordinary skill in the art.

In one particular embodiment of the present subject matter, a first portion of memory/media 48a is configured to store input data for the subject tire measurement system and related processing methods. Input data stored in memory/media element 48a may include raw data measured by the laser sensors 22 and associated components coupled to measurements machine 12. Input data stored in memory/media element 48a may also include predetermined tire parameters, such as but not limited to tire radius, tire width, tire mass, tire pressure, tire radial stiffness, tire tangential stiffness, tire bending stiffness, tire extensional stiffness, tread locations, general tire data and the like. Such predetermined parameters may be pre-programmed into memory/media element 48a or provided for storage therein when entered as input data from a user accessing the input device 50.

Input device 50 may correspond to one or more peripheral devices configured to operate as a user interface with computer 42. Exemplary input devices may include but are not limited to a keyboard, touch-screen monitor, microphone, mouse and the like.

Second memory element 48b includes computer-executable software instructions that can be read and executed by processor(s) 44 to act on the input data stored in memory/media element 48a to create new output data (e.g., filtered data, waveform displays, etc.) for storage in a third memory/media element 48c. Selected portions of the output data may then be provided to one or more peripheral output devices 52.

Output device 52 may correspond to a display such as a monitor, screen, etc., a printer, or a process controller. A process controller may correspond to an output device, controller mechanism or other modular element adapted to assist with tire evaluation processes such as sorting or grading or with structural modification processes such as grinding or implementing manufacturing process adjustments. Evaluation processes, such as sorting or grading, may generally involve determining whether measured tire performance characteristics are below some predetermined limitations. If characteristics are within acceptable limits, then the tires may be identified as acceptable for delivering to a customer. If above acceptable limits, tires may be rejected or subjected to a modification process. An exemplary modification process corresponds to grinding or adding extra mass to the tire at particular determined locations in accordance with tire grinding or mass adding processes as are understood by one or skill in the art of tire manufacturing. Alternatively, the determination of certain tire characteristics by computer 42 may be utilized in a feedback modification to improve selected of the various processes that are involved in tire manufacturing, such as but not limited to steps of applying various layers of rubber compound and/or other suitable materials to form a tire carcass, providing a tire belt portion and tread portion to form the tire crown block, curing the finished green tire, etc.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of processing geometric measurements of a tire, comprising
measuring the surface of a tire to obtain an electronic data set of geometric measurements including a plurality of parameter values at respective angular positions relative to the given tire;
electronically identifying selected ones of the parameter values that lie on a convex hull surrounding the entire set of values; and
electronically interpolating the identified selected ones of the parameter values that lie on the convex hull to obtain a final data set of filtered geometric measurements
wherein said steps of electronically identifying and electronically interpolating are performed once for the data set of geometric measurements initially obtained in said measuring step and separately for the inverted data set of geometric measurements, resulting in perspective first and second final data sets of filtered geometric measurements.

2. The method of claim 1, further comprising a step of electronically filtering selected parameter values within the obtained data set that have greater magnitude than adjacent parameter values, wherein said electronically filtering step is performed before said electronically identifying step.

3. The method of claim 1, wherein the measured surface of the tire comprises at least one location along the tire sidewall or shoulder, and wherein the method further comprises a step of electronically analyzing the final data set of filtered geometric measurements to identify sidewall deformation characteristics in the form of one or more of sidewall projections and sidewall depressions.

4. The method of claim 1, wherein the measured surface of the tire comprises at least one location along the tire crown, and wherein the method further comprises decomposing the final data set of filtered geometric measurements into a plurality of harmonic components.

5. The method of claim 1, further comprising: a step before said electronically identifying step of inverting the data set of geometric measurements; and a step after said electronically interpolating step of inverting the final data set of filtered geometric measurements.

6. The method of claim 1, wherein the first final data set of filtered geometric measurements is analyzed to identify the presence of any sidewall projections, and wherein the second final data set of filtered geometric measurements is analyzed to identify the presence of any sidewall depressions.

7. The method of claim 1, wherein said step of electronically identifying selected ones of the parameter values that lie on a convex hull surrounding the entire set of values comprises transforming each parameter value into a surface value expressed in terms of a curvature location along the surface of the given tire, measured in first and second orthogonal directions.

8. The method of claim 1, wherein said step of electronically identifying selected ones of the parameter values that lie on a convex hull surrounding the entire set of values comprises determining the subset of points that forms the vertices of the smallest convex geometric shape to encompass the data set of two-dimensional values.

9. The method of claim 1, wherein each parameter value corresponds to a run-out value $u_n$, n=1, 2, 3, ..., N for some predetermined integer value N at respective angular positions $\theta_n$, and wherein each run-out value in the data set of geometric measurements is transformed into two-dimensional form represented by first and second quantities $R_{nx}$ and $R_{nz}$ determined by the following equations: $R_{nx}=(R_0+u_n)\cos\theta_n$; and $R_{nz}=(R_0+u_n)\sin\theta_n$.

10. The method of claim 9, where $R_0$ comprises a nominal radius or a selected constant value.

11. The method of claim 1, wherein said electronically interpolating step comprises performing linear interpolation, cubic spline interpolation or fill interpolation.

12. A tire measurement system for processing measurement characteristics associated with a given tire rotated at one or more predetermined speeds, said tire measurement system more particularly comprising:
a first memory adapted for storing measurements, each measurement corresponding to a geometric parameter value obtained at an angular position relative to the given tire;
a second memory adapted for storing software in the form of computer-executable instructions; and
at least one processor coupled to said first and second memories and configured to selectively implement the computer-executable instructions stored in the second memory to process the measurements stored in the first memory;
wherein said at least one processor implements the computer-executable instructions stored in said second memory in order to implement the functions of: identifying selected ones of the geometric parameter values that lie on a convex hull surrounding the entire set of values, and interpolating the identified selected ones of the geometric parameter values that lie on the convex hull to obtain a final data set of filtered measurements
wherein said it least one processor is further configured to transform the plurality of geometric parameter values into two-dimensional form by characterizing the geometric parameter values in terms of a curvature location along the surface of the given tire measured in first and second orthogonal directions.

13. The tire measurement system of claim 12, wherein said at least one processor is further configured to filter selected geometric parameter values within the obtained data set that have greater magnitude than adjacent values, wherein the filtering of selected geometric parameter values occurs before the identifying of selected ones of the geometric parameter values that lie on a convex hull surrounding the entire set of values.

14. The tire measurement system of claim 12, wherein the measurements stored in said first memory comprise radial run-out measurements, and wherein said at least one processor is further configured to decompose the plurality of run-out measurements into a plurality of harmonic components.

15. The tire measurement system of claim 12, wherein the measurements stored in said first memory comprise lateral run-out measurements and wherein said at least one processor is further configured to analyze the final data set of filtered run-out measurements to identify sidewall deformation locations for lateral run-out measurements.

16. The tire measurement system of claim 12, wherein said at least one processor is further configured to invert each geometric parameter value in the set of measurements before identifying selected ones of the geometric parameter values that lie on a convex hull surrounding the entire set of values, and to invert the final data set of filtered measurements after interpolating the identified selected ones of the geometric parameter values.

17. The tire measurement system of claim 16, wherein the identifying and interpolating implemented by said at least one processor are performed once for the initial data set of measurements stored in said first memory and again separately for the inverted data set of measurements, resulting in respective first and second final data sets of filtered measurements.

18. The tire measurement system of claim 17, wherein said at least one processor is further configured to analyze the first final data set of filtered measurements to identify the presence of any sidewall projections, and to analyze the second final data set of filtered measurements to identify the presence of any sidewall depressions.

* * * * *